US006513215B2

(12) United States Patent
Imaizumi

(10) Patent No.: US 6,513,215 B2
(45) Date of Patent: Feb. 4, 2003

(54) INSULATION DISPLACEMENT STAND AND AUTOMATIC INSULATION DISPLACEMENT MACHINE INCLUDING THE SAME

(75) Inventor: Hiroyuki Imaizumi, Osaka (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 114 days.

(21) Appl. No.: 09/843,863

(22) Filed: Apr. 30, 2001

(65) Prior Publication Data

US 2001/0037554 A1 Nov. 8, 2001

(30) Foreign Application Priority Data

May 2, 2000 (JP) ....................................... 2000-134055

(51) Int. Cl.[7] .................................................. B23P 23/04

(52) U.S. Cl. ....................... 29/33 M; 29/564.1; 29/753; 29/748; 29/747; 29/857; 81/9.51

(58) Field of Search ............................ 29/33 M, 564.4, 29/564.1, 564.3, 564.6, 592.1, 729, 748, 747, 857; 81/9.51

(56) References Cited

U.S. PATENT DOCUMENTS 3,965,558 A * 6/1976 McKee ......................... 29/749
4,351,110 A * 9/1982 Folk ............................ 29/749
4,918,804 A * 4/1990 Bleuel et al. .............. 29/33 M
5,187,861 A * 2/1993 Hillegonds et al. ........... 29/751
5,197,171 A * 3/1993 Hatfield ...................... 29/33 M
5,745,975 A * 5/1998 Heisner et al. ............ 29/33 M
5,797,179 A * 8/1998 Unger et al. ............... 29/33 M

FOREIGN PATENT DOCUMENTS

JP 8-235945 9/1996

* cited by examiner

*Primary Examiner*—A. L. Wellington
*Assistant Examiner*—Dana Ross
(74) *Attorney, Agent, or Firm*—Oblon, Spivak, McClelland, Maier & Neustadt, P.C.

(57) ABSTRACT

An insulation displacement stand includes: a fixed rack in which a first surface for receiving a pressure-receiving surface of a connector housing and a second surface escaping from a locking portion are formed with a difference in level in a heightwise direction; a movable rack in which a third surface for receiving a connection surface having contact connection portions opened in the connector housing and a fourth surface for receiving the surface having electric wire insertion holes opened in the connector housing are formed; and a braking unit provided in the fixed rack and pressing the connector housing against the third surface by pressing a surface of the connector housing from which electric wires are drawn out. In the insulation displacement stand, the movable rack is provided so that the movable rack can be apart from the fixed rack in the heightwise direction.

14 Claims, 22 Drawing Sheets

INSULATION DISPLACEMENT STAND AND AUTOMATIC INSULATION DISPLACEMENT MACHINE INCLUDING THE SAME

BACKGROUND OF THE INVENTION

1. Field of the Invention

The present invention relates to a technical field of an auto ID machine (automatic insulation displacement machine) for pushing electric wires into slots of contacts in an insulation displacement connector and for inserting cores of the electric wires to the slots by insulation displacement. Particularly, the present invention relates to improvement of an insulation displacement stand for retaining the insulation displacement connector.

2. Description of the Related Art

Generally, an auto ID machine (that is, automatic insulation displacement machine) includes an insulation displacement stand for retaining an insulation displacement connector, a movable unit moving back and forth relative to the insulation displacement stand, and a punch attached to the movable unit. On the other hand, the insulation displacement connector includes a substantially box-like connector housing, and contacts which are inserted into cavities of the connector housing and which have slots in the upper portions of the contacts for inserting cores of electric wires by insulation displacement. Electric wire insertion holes communicating with the slots of the contacts are opened in the upper surface of the connector housing. The lower surface is used as a pressure-receiving surface for receiving a load by insulation displacement. While the insulation displacement connector is retained in the insulation displacement stand, end portions of the electric wires are put on the electric wire insertion holes and pressed by the punch of the movable unit so as to be pushed into the slots. In this manner, insulation displacement is performed (for example, see JP-A-8-235945).

The insulation displacement stand has a horizontal surface for receiving the pressure-receiving surface of the connector housing of the insulation displacement connector, and a vertical surface for receiving the front or rear surface of the connector housing. An insulation displacement load received on the pressure-receiving surface of the connector housing is caught by the horizontal surface. Moreover, the connector housing is positioned in the front-rear direction by being pushed against the vertical surface, for example, by a braking unit provided separately. A pressing surface protruding slightly like a hood from the vertical surface so as to engage with the upper surface of the connector housing is formed in the insulation displacement stand. The pressing surface prevents the connector housing from floating up from the insulation displacement stand. The horizontal surface, the vertical surface and the retaining surface are formed up to the left and right end surfaces of the insulation displacement stand. Therefore, in the insulation displacement stand, a groove shaped like a substantially sideways U-figure in section is formed by the horizontal surface, the vertical surface and the retaining surface. The insulation displacement connector to which the electric wires have been not inserted yet with insulation displacement is inserted from one end of the groove and slid in the right-left direction. Further, the insulation displacement connector is decelerated by the braking unit so as to be positioned in a position for insulation displacement. When the movable unit is then moved back and forth, the electric wires are connected to the insulation displacement connector with insulation displacement. After the completion of insulation displacement, the insulation displacement connector is pulled in a direction of extending of the electric wires, so that the insulation displacement connector is released from the insulation displacement stand.

Incidentally, Japanese Patent Application 2000-95953 which has been filed by the Applicant of the present invention discloses an insulation displacement connector which can be connected with electric wires with insulation displacement by means of an auto ID machine even if the insulation displacement connector is provided with a locking portion. The insulation displacement connector includes a substantially box-like connector housing and contacts. The connector housing has cavities piercing the connector housing, for example, in the front-rear direction, and each of the contacts has a connection portion at one end and slots for connecting cores of electric wires in an upper or lower surface on the other end side with insulation displacement. The contacts are inserted into the cavities of the connector housing respectively. Electric wire insertion holes communicating with the slots are opened in the upper or lower surface of the connector housing. A surface on a side vertically opposite to the upper or lower surface of the connector housing is used as a pressure-receiving surface for receiving a load by insulation displacement. A locking portion to be engaged with a partner connector is provided on the contact connection portion side in the pressure-receiving surface so as to protrude outward.

To retain such an insulation displacement connector in the auto ID machine, a recess portion for making the locking portion escape must be formed in the horizontal surface of the insulation displacement stand. However, if it is formed so, there is still a problem that, when the insulation displacement connector is released from the insulation displacement stand, the locking portion is hooked by the recess portion so that the insulation displacement connector cannot depart from the insulation displacement stand.

SUMMARY OF THE INVENTION

The present invention was achieved by paying attention to this respect and an object thereof is to provide an insulation displacement stand which enables smooth insulation displacement and release of an insulation displacement connector including a locking portion even in the case where the insulation displacement stand is attached to a conventional auto ID machine, and further to provide an auto ID machine having such an insulation displacement stand.

In order to achieve the above object, according to a first aspect of the invention, there is provided an insulation displacement stand to be attached to an automatic insulation displacement machine for connecting cores of electric wires to an insulation displacement connector with insulation displacement, the insulation displacement connector including a substantially box-like connector housing and contacts, the connector housing having cavities piercing the connector housing in a front-rear direction, the contacts each having a connection portion at one end and slots for connecting corresponding one of the cores of the electric wires with insulation displacement in an upper or lower surface on the other end side, the contacts being inserted in the cavities of the connector housing, the connector housing having electric wire insertion holes opened in an upper or lower surface of the connector housing so as to communicate with the slots, and a surface vertically opposite to the upper or lower surface to be used as a pressure-receiving surface for receiving an insulation displacement load, a locking portion to be engaged with a partner connector being provided on a contact connection portion side of the pressure-receiving surface so as to protrude outward therefrom, wherein the insulation displacement stand includes: a fixed rack in which a first surface for receiving the pressure-receiving surface of the connector housing and a second surface which escapes from the locking portion are formed with a difference in level in a heightwise direction and up to at least one side end surface on a side where the insulation displacement connectors are charged; a movable rack in which a third surface for receiving a connection surface having contact connection portions opened in the connector housing and a fourth surface for receiving the contact connection portion side in a surface having electric wire insertion holes opened in the connector housing are formed up to at least one side end surface on a side where the insulation displacement connectors are charged; and a braking unit provided in the fixed rack and pressing the connector housing against the third surface by pressing a surface of the connector housing from which the electric wires are drawn out, the movable rack being provided so that the movable rack can be apart from the fixed rack in the heightwise direction.

The first, second, third and fourth surfaces are formed up to at least one end surface of the fixed and movable racks on a side where the insulation displacement connector is charged. Hence, a groove extending in the right-left direction is formed in the insulation displacement stand by the first, second, third and fourth surfaces. When the insulation displacement connector to which the electric wires have not been connected yet is inserted from one end of the groove and slid in the right-left direction, the insulation displacement connector is decelerated by the braking unit so as to be positioned in an insulation displacement position. Then, when end portions of the electric wires are led to the slots and pressed by the punch so as to be pushed into the slots, insulation displacement is performed. At the time of insulation displacement, an insulation displacement load received on the pressure-receiving surface of the connector housing is caught by the first surface. The locking portion is made to escape by the difference in level between the first and second surfaces. The connector housing is positioned in the front-rear direction by the third surface and the braking unit. The fourth surface prevents the connector housing from floating up from the insulation displacement stand. After insulation displacement of the electric wires to the insulation displacement connector is completed, the insulation displacement connector is not restricted by the third and fourth surfaces if the movable rack is made apart from the fixed rack in the heightwise direction. Hence, the insulation displacement connector is pulled in a direction of extending of the electric wires, so that the insulation displacement connector is released from the insulation displacement stand.

In the insulation displacement stand defined in a second aspect of the invention, preferably, in the configuration stated in the first aspect of the invention, the fixed rack and the movable rack are provided so as to be rotatable around a shaft extending in a right-left direction on the third surface.

In such a manner, the provision of the movable rack which can be made apart from the fixed rack in the heightwise direction can be achieved by a simple structure.

According to a third aspect of the invention, preferably, the automatic insulation displacement machine having the insulation displacement stand as stated in the first or second aspect of the invention is characterized in that the automatic insulation displacement machine includes: an electric wire supplying unit in which consecutive electric wires are reserved; a stationary chuck disposed in front of the electric wire supplying unit for clamping or releasing the electric wires; a movable chuck disposed in front of the stationary chuck for clamping or releasing the electric wires while the movable chuck moves in the front-rear direction; a pressing chuck disposed between the stationary chuck and the movable chuck for clamping or releasing the electric wires; an insulation displacement stand provided on an upper or lower side of the electric wires between the stationary chuck and the pressing chuck; a movable rack driving mechanism for retaining the movable rack in a regular position to bring the movable rack into contact with the insulation displacement connector in a normal state and for rotating the movable rack in a direction to make the movable rack apart from the fixed rack at a time of completion of insulation displacement; a wire guide provided on a side opposite to the insulation displacement stand with respect to the electric wires and moving back and forth relative to the insulation displacement stand so as to lead end portions of the electric wires onto slots of the insulation displacement connector; a punch provided on a side opposite to the insulation displacement stand with respect to the electric wires and moving back and forth relative to the insulation displacement stand so as to push the end portions of the electric wires onto the slots of the insulation displacement connector; a cutting mechanism for cutting the electric wires; a connector charging unit for charging the insulation displacement connector in the insulation displacement stand; and a control unit for controlling the movable chuck to move forward and stop while the movable chuck clamps the end portions of the electric wires drawn out from the electric wire supplying unit through the stationary chuck, controlling the stationary chuck and the pressing chuck to strain and clamp the electric wires, controlling the cutting mechanism to cut the electric wires, controlling the wire guide to advance so as to lead the cut end portions of the electric wires onto the slots of the insulation displacement connector retained in the insulation displacement stand, controlling the punch to advance so as to push the cut end portions of the electric wires into the slots, controlling the wire guide and the punch to retreat, and controlling the movable rack driving mechanism to make the movable rack apart from the fixed rack in the insulation displacement stand.

In the case of the third aspect of the invention, by control of the control unit, first, the movable chuck moves forward and stops while clamping the end portions of the electric wires drawn out from the electric wire supplying unit through the stationary chuck. Then, the electric wires are strained and clamped by the stationary chuck and the pressing chuck. Then, the electric wires are cut by the cutting mechanism. The wire guide is advanced so that the cut end portions of the electric wires are led onto the slots of the insulation displacement connector retained in the insulation displacement stand. Then, the punch is advanced so that the cut endportions of the electric wires are pushed into the slots. Then, the wire guide and the punch are retreated. When the movable rack is further moved apart from the fixed rack in the insulation displacement stand, the insulation displacement connector to which the electric wires have been connected with insulation displacement is released from the insulation displacement stand.

According to a fourth aspect of the invention, preferably, the automatic insulation displacement machine having an insulation displacement stand as stated in the first or second aspect of the invention is characterized in that the automatic insulation displacement machine includes: an electric wire supplying unit in which consecutive electric wires are reserved; a stationary chuck disposed in front of the electric wire supplying unit for clamping or releasing the electric wires; a movable chuck disposed in front of the stationary chuck for clamping or releasing the electric wires while the movable chuck moves in the front-rear direction; a pressing chuck disposed between the stationary chuck and the movable chuck for clamping or releasing the electric wires; a first insulation displacement stand constituted by an insulation displacement stand between the stationary chuck and the pressing chuck and having a first surface provided on an upper or lower side of the electric wires so that the first surface faces the electric wires; a second insulation displacement stand constituted by an insulation displacement stand provided in front of the first insulation displacement stand between the stationary chuck and the pressing chuck and having a first surface provided on an upper or lower side of the electric wires so that the first surface faces the electric wires; a movable rack driving mechanism for retaining each of movable racks of the insulation displacement stands in a regular position to bring the movable rack into contact with an insulation displacement connector in a normal state and for rotating the movable rack in a direction so as to make the movable rack apart from a corresponding fixed rack at a time of completion of insulation displacement; a first wire guide provided on a side opposite to the first insulation displacement stand with respect to the electric wires and moving back and forth relative to the first insulation displacement stand so as to lead end portions of the electric wires onto slots of the insulation displacement connector; a first punch provided on the side opposite to the first insulation displacement stand with respect to the electric wires and moving back and forth relative to the first insulation displacement stand so as to push the end portions of the electric wires into the slots of the insulation displacement connector; a second wire guide provided on a side opposite to the second insulation displacement stand with respect to the electric wires and moving back and forth relative to the second insulation displacement stand so as to lead end portions of the electric wires onto slots of the other insulation displacement connector; a second punch provided on the side opposite to the second insulation displacement stand with respect to the electric wires and moving back and forth relative to the second insulation displacement stand so as to push end portions of the electric wires into the slots of the other insulation displacement connector; a cutting mechanism for cutting the electric wires between the first and second insulation displacement stands; a connector charging unit for charging the insulation displacement connectors in both of the insulation displacement stands respectively; and a control unit for controlling the movable chuck to move forward and stop while the movable chuck clamps the end portions of the electric wires drawn out from the electric wire supplying unit through the stationary chuck, controlling the stationary chuck and the pressing chuck to strain and clamp the electric wires, controlling the cutting mechanism to cut the electric wires, controlling the first wire guide to advance so as to lead the stationary-chuck-side cut end portions of the electric wires onto the slots of the insulation displacement connector retained in the first insulation displacement stand, controlling the first punch to advance so as to push the cut end portions of the electric wires into the slots, controlling the second wire guide to advance in parallel with the controlling of the first punch so as to lead the movable-chuck-side cut end portions of the electric wires onto the slots of the insulation displacement connector retained in the second insulation displacement stand, controlling the second punch to advance so as to push the cut end portions of the electric wires into the slots, controlling the two wire guides and the two punches to retreat, and controlling the movable rack driving mechanism to make the movable rack apart from the fixed rack in each of the insulation displacement stands.

In the case of the fourth aspect of the invention, by control of the control unit, first, the movable chuck moves forward and stops while clamping the end portions of the electric wires drawn out from the electric wire supplying unit through the stationary chuck. Then, the electric wires are strained and clamped by the stationary chuck and the pressing chuck. Then, the electric wires are cut by the cutting mechanism. The first wire guide is advanced so that the stationary-chuck-side cut end portions of the electric wires are led onto slots of the insulation displacement connector retained in the first insulation displacement stand. Then, the first punch is advanced so that the cut end portions are pushed into the slots. In parallel with this, the second wire guide S is advanced so that the movable-chuck-side cut end portions of the electric wires are led onto slots of the insulation displacement connector retained in the second insulation displacement stand. Then, the second punch is advanced so that the cut end portions are pushed into the slots. Then, the two wire guides and the two punches are retreated. When the movable racks are further moved apart from the fixed racks in the insulation displacement stands respectively by the movable rack driving mechanisms, the insulation displacement connector to which the stationary-chuck-side cut end portions of the electric wires have been connected with insulation displacement is released from the first insulation displacement stand whereas the insulation displacement connector to which the movable-chuck-side cut end portions of the electric wires have been connected with insulation displacement is released from the second insulation displacement stand.

The automatic insulation displacement machine according to a fifth aspect of the invention is provided with a split type insulation displacement stand as stated in the first or second aspect of the invention, and further provided with an integral type insulation displacement stand having a first surface for receiving a pressure-receiving surface of a connector housing of an insulation displacement connector stated in the first or second aspect of the invention, a second surface formed with a difference in level in a heightwise direction from the first surface so that the second surface can escape from the locking portion, a third surface for receiving the connection surface having contact connection portions opened in the connector housing, and a fourth surface for receiving the contact connection portion side in a surface having the electric wire insertion holes opened in the connector housing, the first, second, third and fourth surfaces being formed up to opposite side end surfaces, the integral type insulation displacement stand further having a braking unit for pushing the connector housing against the third surface by pressing a surface of the connector housing from which the electric wires are drawn out, characterized in that the automatic insulation displacement machine includes: an electric wire supplying unit in which consecutive electric wires are reserved; a stationary chuck disposed in front of the electric wire supplying unit for clamping or releasing the electric wires; a movable chuck disposed in front of the stationary chuck for clamping or releasing the electric wires while the movable chuck moves in the front-rear direction; a pressing chuck disposed between the stationary chuck and the movable chuck for clamping or releasing the electric wires; a first insulation displacement stand constituted by the split type insulation displacement stand between the stationary chuck and the pressing chuck and having a first surface provided on an upper or lower side of the electric wires so that the first surface faces the electric wires; a second insulation displacement stand constituted by the integral type insulation displacement stand provided in front of the first insulation displacement stand between the stationary chuck and the pressing chuck and having a first surface provided on an upper or lower side of the electric wires so that the first surface faces the electric wires; a movable rack driving mechanism for retaining a movable rack of the first insulation displacement stand in a regular position to bring the movable rack into contact with an insulation displacement connector in a normal state and for rotating the movable rack in a direction so as to make the movable rack apart from a fixed rack at a time of completion of insulation displacement; a first wire guide provided on a side opposite to the first insulation displacement stand with respect to the electric wires and moving back and forth relative to the first insulation displacement stand so as to lead end portions of the electric wires onto slots of the insulation displacement connector; a first punch provided on the side opposite to the first insulation displacement stand with respect to the electric wires and moving back and forth relative to the first insulation displacement stand so as to push the end portions of the electric wires into the slots of the insulation displacement connector; a second wire guide provided on a side opposite to the second insulation displacement stand with respect to the electric wires and moving back and forth relative to the second insulation displacement stand so as to lead end portions of the electric wires onto slots of the other insulation displacement connector; a second punch provided on the side opposite to the second insulation displacement stand with respect to the electric wires and moving back and forth relative to the second insulation displacement stand so as to push end portions of the electric wires into the slots of the other insulation displacement connector; a cutting mechanism for cutting the electric wires between the first and second insulation displacement stands; a connector charging unit for charging the insulation displacement connectors in both of the insulation displacement stands respectively; and a control unit for controlling the movable chuck to move forward and stop while the movable chuck clamps the end portions of the electric wires drawn out from the electric wire supplying unit through the stationary chuck, controlling the stationary chuck and the pressing chuck to strain and clamp the electric wires, controlling the cutting mechanism to cut the electric wires, controlling the first wire guide to advance so as to lead the stationary-chuck-side cut end portions of the electric wires onto the slots of the insulation displacement connector retained in the first insulation displacement stand, controlling the first punch to advance so as to push the cut end portions of the electric wires into the slots, controlling the second wire guide to advance in parallel with the controlling of the first punch so as to lead the movable-chuck-side cut end portions of the electric wires onto the slots of the insulation displacement connector retained in the second insulation displacement stand, controlling the second punch to advance so as to push the cut end portions of the electric wires into the slots, controlling the two wire guides and the two punches to retreat, and controlling the movable rack driving mechanism to make the movable rack apart from the fixed rack in the first insulation displacement stand.

In the case of the fifth aspect of the invention, by control of the control unit, first, the movable chuck moves forward and stops while clamping the end portions of the electric wires drawn out from the electric wire supplying unit through the stationary chuck. Then, the electric wires are strained and clamped by the stationary chuck and the pressing chuck. Then, the electric wires are cut by the cutting mechanism. The first wire guide is advanced so that the stationary-chuck-side cut end portions of the electric wires are led onto slots of the insulation displacement connector retained in the first insulation displacement stand. Then, the first punch is advanced so that the cut end portions are pushed into the slots. In parallel with this, the second wire guide is advanced so that the movable-chuck-side cut end portions of the electric wires are led onto slots of the insulation displacement connector retained in the second insulation displacement stand. Then, the second punch is advanced so that the cut end portions are pushed into the slots. Then, the two wire guides and the two punches are retreated. When the movable rack is further moved apart from the fixed rack in the first insulation displacement stand by the movable rack driving mechanism, the insulation displacement connector to which the stationary-chuck-side cut end portions of the electric wires have been connected with insulation displacement is released from the first insulation displacement stand. Further, the insulation displacement connector to which the movable-chuck-side cut end portions of the electric wires have been connected with insulation displacement in the second insulation displacement stand is released from a side end surface on a side opposite to the side where the insulation displacement connector is charged.

DETAILED DESCRIPTION OF THE PREFERRED EMBODIMENTS

Embodiments of a split type insulation displacement stand and an automatic insulation displacement machine (hereinafter, referred as an auto ID machine) having such an insulation displacement stand according to the present invention will be described below.

Figure 19:
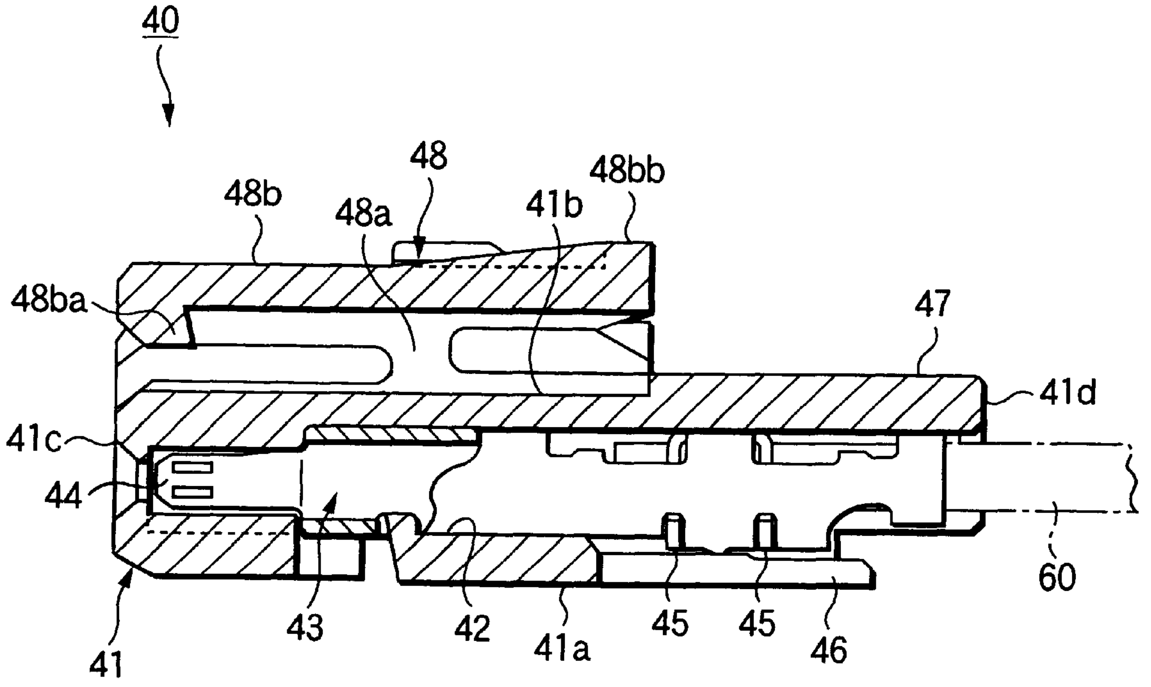
FIG. 19 is a vertical sectional view of an insulation displacement connector including a locking portion, which is connected with insulation displacement by means of the auto ID machine according to the first embodiment.
Figure 20:
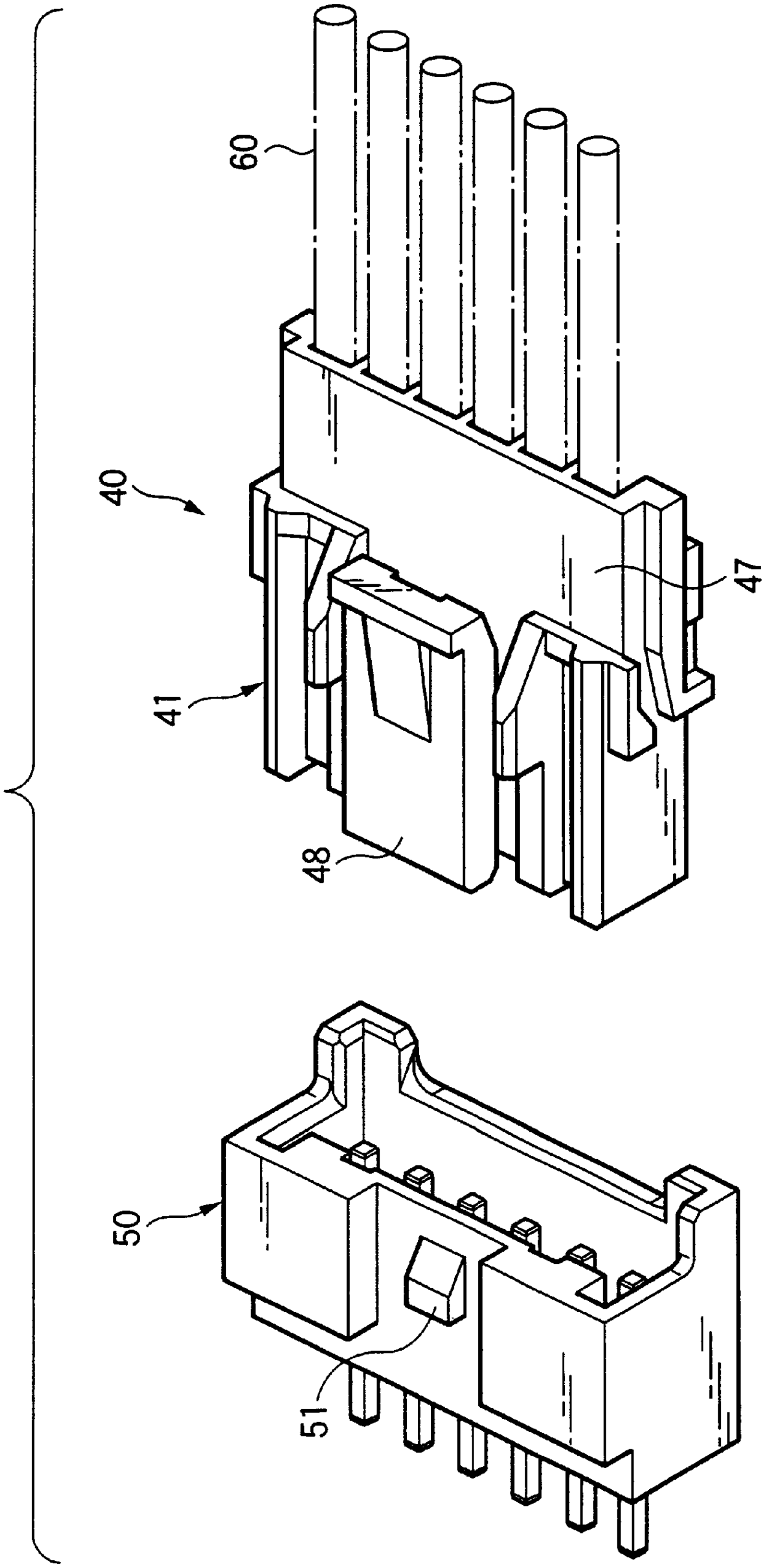
FIG. 20 is a perspective view showing the insulation displacement connector including a locking portion and a partner connector.
Figure 21:
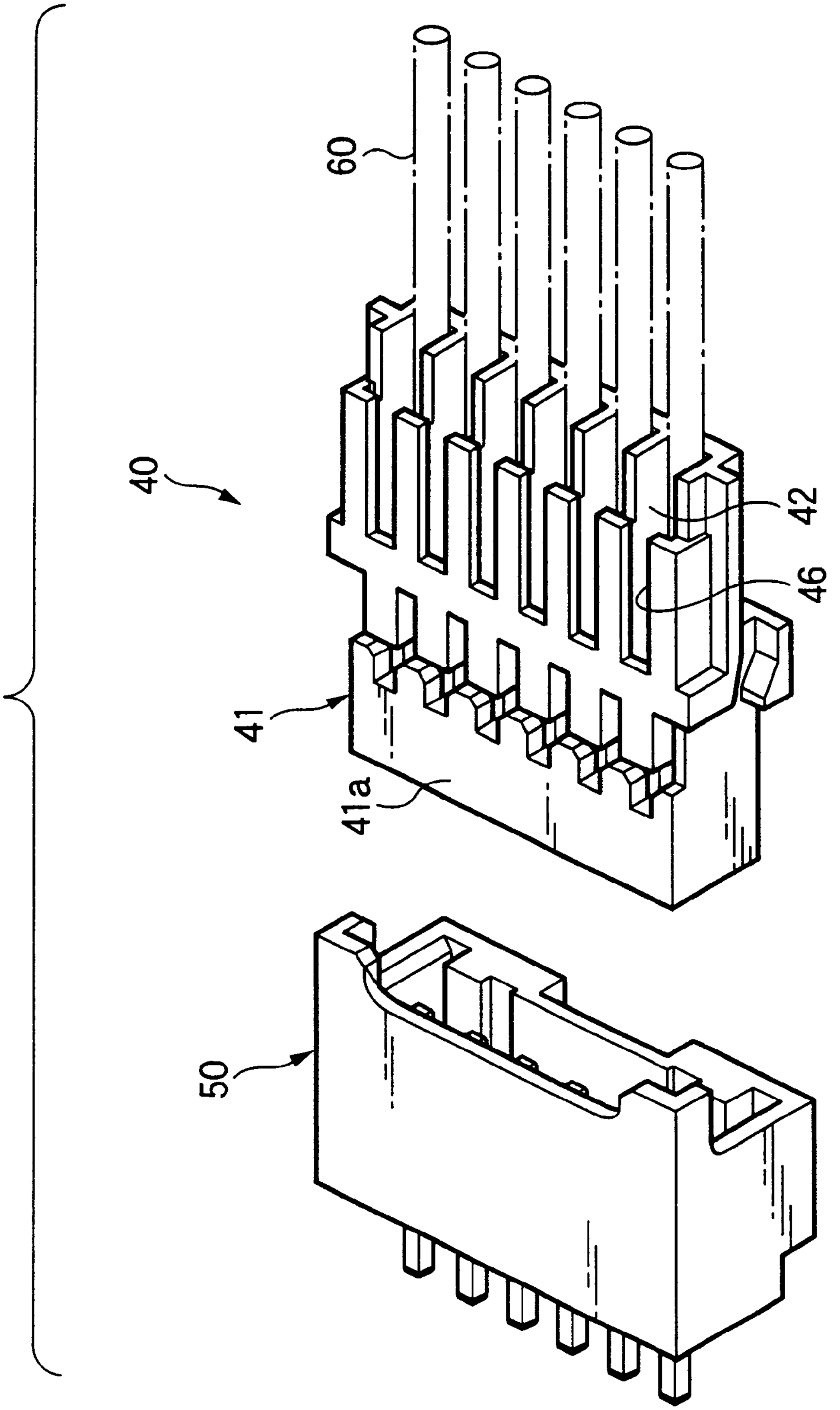
FIG. 21 is a perspective view of the insulation displacement connector including a locking portion and the partner connector viewed from an angle different from that in FIG. 20.

An insulation displacement connector including a locking portion to which electric wires are to be connected by this auto ID machine will be described first. FIGS. 19 to 21 show the insulation displacement connector 40 including a locking portion according to this embodiment of the present invention. Although the embodiment of the invention shows a six-pole insulation displacement connector 40 by way of example, the number of poles can be selected at option. Electric wires 60 of the number corresponding to the number of poles are connected to the insulation displacement connector 40. The insulation displacement connector 40 is connected to a partner connector 50.

The insulation displacement connector 40 includes a connector housing 41, and male or female contacts 43. The connector housing 41 is shaped substantially like a box. Cavities 42 pierce the connector housing 41 in the front-rear direction. Each of the contacts 43 has a connection portion 44 at one end and slots 45 in an upper or lower surface of the other end side, so that a core of a corresponding electric wire 60 is connected by the slots 45 with insulation displacement. The contacts 43 are inserted into the cavities 42 of the connector housing 41 respectively. Electric wire insertion holes 46 communicating with the slots 45 are opened in an upper or lower surface of the connector housing 41. A surface vertically opposite to the surface in which the electric wire insertion holes 46 are opened is used as a pressure-receiving surface 47 for receiving a insulation displacement load. A locking portion 48 for engaging the connector 40 with the partner connector 50 is provided on the contact connection portion side of the pressure-receiving surface 47 so as to protrude outward from the surface 47. Of the upper and lower surfaces of the connector housing 41, the surface having the electric wire insertion holes 46 opened therein is now called "front surface 41*a*" and the surface formed to be the pressure-receiving surface 47 and having the locking portion 48 provided thereon is now called "rear surface 41*b*". The surface of the connector housing 41 having the contact connection portions 44 opened therein is now called "connection surface 41*c*" and a surface opposite to the surface 41*c* in the front-rear direction, that is, a surface from which electric wires are drawn out, is now called "wire-out surface 41*d*".

The locking portion 48 has a support portion 48*a* and an arm 48*b*. The support portion 48*a* is formed so as to protrude outward. The arm 48*b* extends in the front-rear direction so as to have an intermediate portion connected to the support portion 48*a* and has an engaging portion 48*ba* at a front end so as to be engaged with the partner connector 50. In this embodiment of the invention, the locking portion 48 is of a so-called outer lock type. Hence, the engaging portion 48*ba* is shaped like a hook bent toward the rear surface 41*b* of the connector housing 41, and an engaged portion 51 to be hooked by the hook-like engaging portion 47*ba* is provided on an outer surface of the partner connector 50. A gripping portion 48*bb* is provided at a rear end of the arm 48*b*. The present invention may further include another embodiment of an insulation displacement connector provided with a so-called inner lock type locking portion. In this embodiment, the engaging portion may be shaped like a hook bent so as to depart from the outer wall portion of the connector housing whereas an engaged portion to be hooked by the hook-like engaging portion may be provided on the outer wall of the partner connector. In such a manner, when the insulation displacement connector is connected to the partner connector, the engaging portion of the arm of the locking portion enters the inside of the connector housing of the partner connector so as to be engaged with the partner connector.

In this manner, a connector housing portion of the connector housing 41 which receives the slots 45 of the contacts 43 is displaced in the front-rear direction compared with the support portion 48*a* and arm 48*b* of the locking portion 48. Hence, the outer surface of the connector housing portion for receiving the slots 45 can be used as a pressure-receiving surface 47 for receiving a insulation displacement load so that the insulation displacement load is received by the insulation displacement connector 40 steadily, and the electric wires 60 can be connected with insulation displacement by an auto ID machine which will be described later. Hence, even if the insulation displacement connector 40 suffers draw-out force from the electric wires 60, the locking portion 48 makes the insulation displacement connector 40 be hard to be disconnected from the partner connector 50. Hence, occurrence of connection failure can be prevented. Moreover, because the connector is used as a insulation displacement connector, both reduction in machining cost and shortening in delivery time of such a connector including an electric wire can be achieved. Moreover, because the fitting length of the contacts 43 can be kept sufficient, connection failure caused by the inclination of the insulation displacement connector 40, or the like, can be prevented even in the case where draw-out force is received from the electric wires 60. Moreover, an intensive clicking sense can be obtained, so that occurrence of connection failure can be prevented in advance when the insulation displacement connector 40 is connected. These effects can be obtained remarkably particularly in a multi-pole connector.

Figure 1:
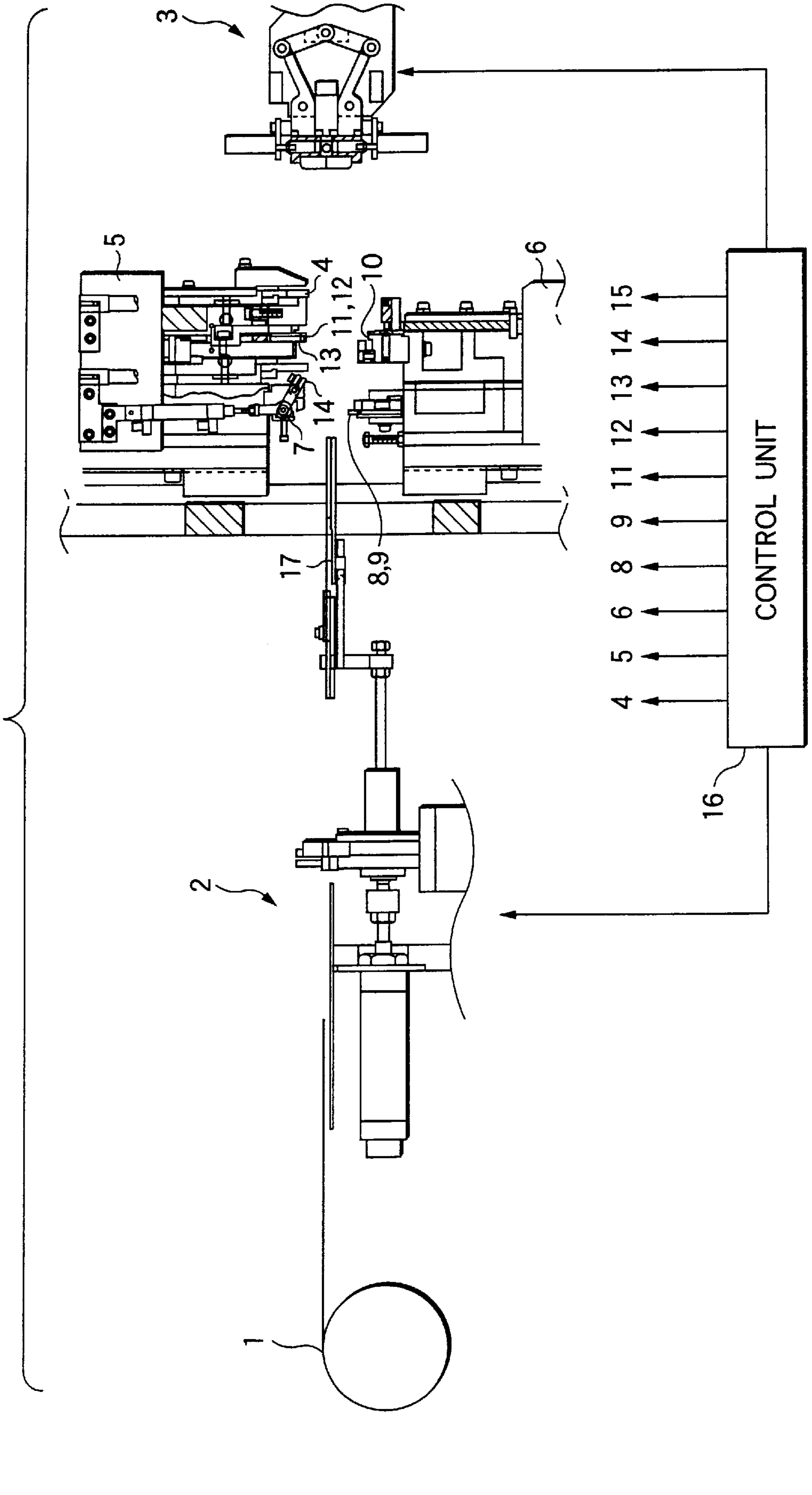
FIG. 1 is an overall schematic view of an auto ID machine (automatic insulation displacement machine) according to a first embodiment of the present invention.
Figure 2:
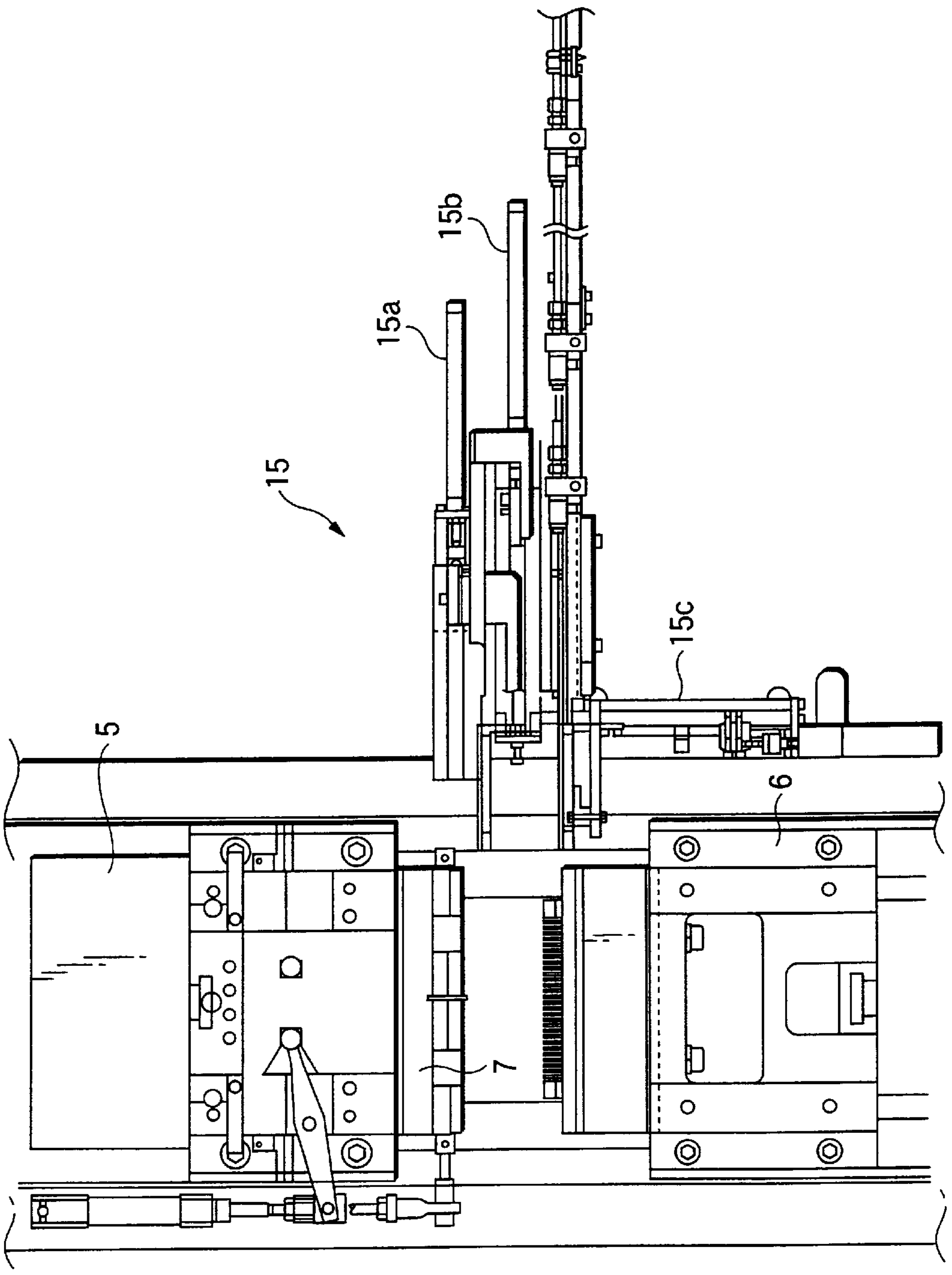
FIG. 2 is a view of an upper unit, a lower unit and a connector charging unit of the auto ID machine viewed from the front side where a movable chuck is provided along the direction of extending of electric wires.

Next, FIGS. 1 to 4 show a first embodiment of an auto ID machine (automatic insulation displacement machine) for connecting cores of electric wires 60 to the aforementioned insulation displacement connector 40 with insulation displacement. In FIG. 1, the reference numeral 1 designates an electric wire supplying unit in which consecutive electric wires 60 are reserved. For example, the electric wire supplying unit 1 is constituted by a reel wound with such consecutive electric wires 60. A stationary chuck 2 for chucking or releasing the electric wires 60 is disposed in front of the electric wire supplying unit 1. The stationary chuck 2 has a pair of clamping members disposed above and under the electric wires 60. At least one of the clamping members is moved up or down to make the pair of claming members close to or apart from each other to thereby clamp or release the electric wires 60. A movable chuck 3 is disposed in front of the stationary chuck 2 so that the movable chuck 3 chucks or releases the electric wires 60 and is movable in the front-rear direction. The movable chuck 3 has a pair of clamping members disposed above and under the electric wires 60. At least one of the clamping members is moved up or down to make the pair of claming members close to or apart from each other to thereby clamp or release the electric wires 60. The front-rear direction used herein means a conveniently determined direction in which the left in FIG. 1 means rearward and the right in FIG. 1 means frontward. In connection with this, the left in FIG. 4 means the left of the auto ID machine and the right in FIG. 4 means the right of the auto ID machine. Further, the upper side in FIGS. 1 to 4 means the upper side of the auto ID machine and the lower side in FIGS. 1 to 4 means the lower side of the auto ID machine.

Members such as a pressing chuck, an insulation displacement stand, a wire guide, a punch, a cutting mechanism, a movable stand driving mechanism, a connector charging unit, etc., which will be described later, are disposed between the stationary chuck 2 and the movable chuck 3. In this embodiment, an upper unit 5 and a lower unit 6 movable up and down are disposed between the stationary chuck 2 and the movable chuck 3 so as to be vertically opposite to each other. Hence, these members such as a pressing chuck, etc. are provided in the upper and lower units 5 and 6. The present invention also includes an embodiment in which these members such as a pressing chuck, etc. are provided individually but without providing the upper and lower units 5 and 6.

A pressing chuck 4 for clamping or releasing the electric wires 60 is provided between the stationary chuck 2 and the movable chuck 3. The pressing chuck 4 has a pair of clamping members disposed above and under the electric wires 60. At least one of the clamping members is moved up or down to make the pair of claming members close to or apart from each other to thereby clamp or release the electric wires 60. In this embodiment, the pressing chuck 4 has an upper clamping member 4*a,* and a lower clamping member 4*b*. The upper clamping member 4*a* is fixed to the upper unit 5. The lower clamping is member 4*b* is provided in the lower unit 6 so as to be movable up and down. A linking mechanism and an elevating mechanism such as a hydraulic cylinder, a pneumatic cylinder etc. are connected to the lower clamping member 4*b* so that the lower clamping member 4*b* can be moved up and down from the lower unit 6 by the elevating mechanism.

A split type insulation displacement stand is provided between the stationary chuck 2 and the pressing chuck 4 and on an upper or lower side of the electric wires 60. In this embodiment, two insulation displacement stands are provided. Of these stands, a first insulation displacement stand 7 is the split type insulation displacement stand. The first insulation displacement stand 7 is provided on an upper or lower side of the electric wires 60 so that a first surface 33 for receiving the pressure-receiving surface 47 of the connector housing 41 faces the electric wires 60. A second insulation displacement stand 10 is constituted by an integral type insulation displacement stand. The second insulation displacement stand 10 is provided in front of the first insulation displacement stand 7 and on an upper or lower side of the electric wires 60 so that the first surface 33 for receiving the pressure-receiving surface 47 of the connector housing 41 faces the electric wires 60. The second insulation displacement stand 10 is reverse to the first insulation displacement stand 7 in the front-rear direction. That is, insulation displacement connectors 40 to be charged in the two insulation displacement stands 7 and 10 respectively are reverse to each other in the front-rear direction. In this embodiment, the first insulation displacement stand 7 is provided on the upper side of the electric wires 60 and the second insulation displacement stand 10 is provided on the lower side of the electric wires 60. The first insulation displacement stand 7 is attached to the upper unit 5 and the second insulation displacement stand 10 is attached to the lower unit 6. The two insulation displacement stands 7 and 10 may be disposed separately on the upper and lower sides of the electric wires 60 in the aforementioned manner. Alternatively, the two insulation displacement stands 7 and 10 may be disposed on the upper side of the electric wires 60. Alternatively, the two insulation displacement stands 7 and 10 may be disposed on the lower side of the electric wires 60.

Figure 5A:
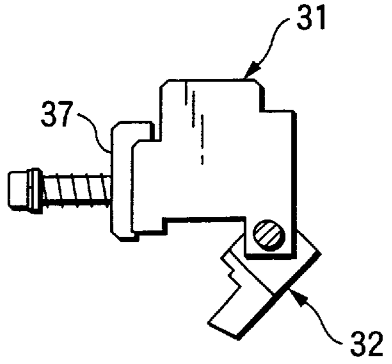
FIGS. 5(*a*) and 5(*b*) are views showing a first insulation displacement stand of the auto ID machine, (*a*) being a side view, (*b*) being a bottom view.
Figure 5B:
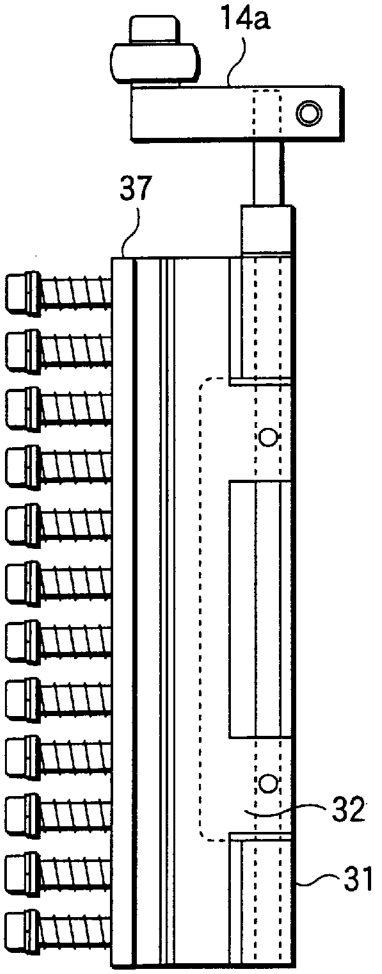
Figure 6:
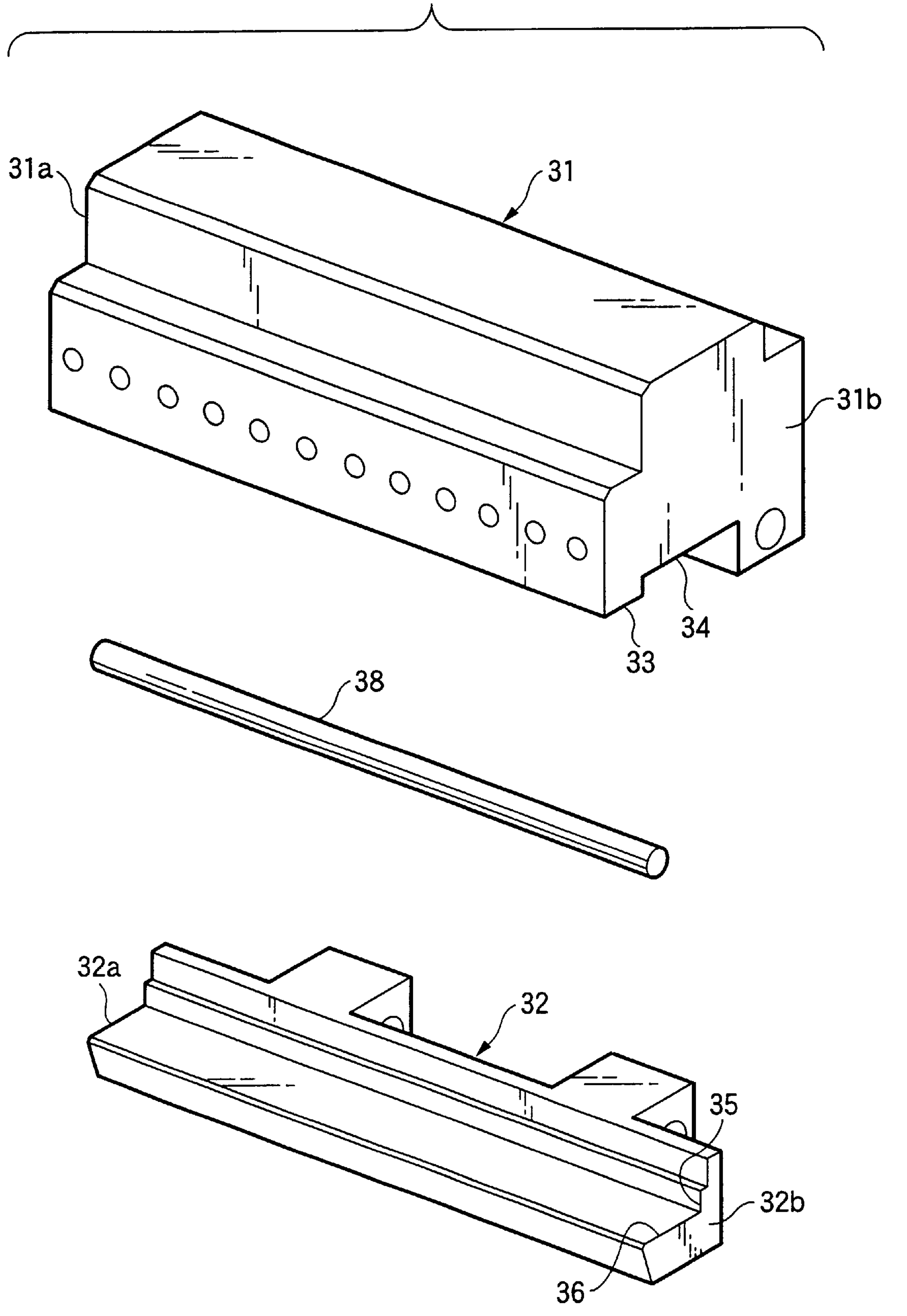
FIG. 6 is an exploded perspective view showing the first insulation displacement stand.

The first insulation displacement stand 7 constituted by a split type insulation displacement stand will be described with reference to FIGS. 5 through 7. The first insulation displacement stand 7 has a fixed rack 31, and a movable rack 32. The fixed rack 31 has a first surface 33 for receiving the pressure-receiving surface 47 of the connector housing 41, and a second surface 34 for running away from the locking portion 48. The first and second surfaces 33 and 34 are formed with a difference in level in the heightwise direction. The first and second surfaces 33 and 34 are formed up to at least one of left and right side end surfaces 31*a* and 31*b* of the fixed rack 31, that is, up to a side end surface on a side where the insulation displacement connector 40 is charged. In this embodiment, the first and second surfaces 33 and 34 are formed up to the left and right end surfaces 31*a* and 31*b* of the fixed rack 31. Because the connector charging unit 15 for charging the insulation displacement connector 40 in the insulation displacement stand 7 is provided on the left side of the auto ID machine in this embodiment, the operation will go well if the first and second surfaces 33 and 34 are formed up to at least the left end surface 31*a* of the fixed rack 31.

The movable rack 32 has a third surface 35 for receiving the connection surface 41*c* having the contact connection portions 44 opened in the connector housing 41, and a fourth surface 36 for receiving the contact connection portion side in the surface 41*a* which is a surface having the electric wire insertion holes 46 opened in the connector housing 41. The third and fourth surfaces 35 and 36 are formed up to at least one of left and right end surfaces 32*a* and 32*b* of the movable rack 32, that is, up to a side end surface on a side where the insulation displacement connector 40 is charged. In this embodiment, the third and fourth surfaces 35 and 36 are formed up to the left and right end surfaces 32*a* and 32*b* of the movable rack 32. Because the connector charging unit 15 for charging the insulation displacement connector 40 in the insulation displacement stand 7 is provided on the left side of the auto ID machine in this embodiment, the operation will go well if the third and fourth surfaces 35 and 36 are formed up to at least the left end surface 32*a* of the movable rack 32.

A braking unit 37 is provided in the fixed rack 31 so that the wire-out surface 41*d* which is a surface of the connector housing 41 and from which the electric wires 60 are drawn out is pressed to thereby press the connector housing 41 against the third surface 35. The braking unit 37 has a brake disc 37*a,* collars 37*b,* bolts 37*c* and coiled springs 37*d.* The brake disc 37*a* is a plate-like member abutting on the front or rear surface of the fixed rack 31 and has an end edge bent like an L-shaped figure in side view to thereby press the wire-out surface 41*d* of the connector housing 41. The collars 37*b* pierce the brake disc 37*a* and abut on the front or rear surface of the fixed rack 31. Each of the bolts 37*c* has a neck portion fitted to the collar 37*b,* and a screw portion piercing the collar 37*b* and engaged with the front or rear surface of the fixed rack 31 by thread. Each of the coiled springs 37*d* is contracted between the neck portion of the bolt 37*c* and the brake disc 37*a.* The length of thread engagement of the bolts 37*c* is changed to change the quantity of contraction of the coiled springs 37*d* so as to adjust the force of pressing the connector housing 41. The collars 37*b* limit the maximum length of thread engagement of the bolts 37*c.* Hence, if the insulation displacement connector 40 in which the electric wires 60 are not yet connected is inserted into the insulation displacement stand 7 from one end of the insulation displacement stand 7 and slid in the right-left direction, the insulation displacement connector 40 is decelerated by the braking unit 37 so as to be positioned in a position for insulation displacement.

The movable rack 32 is provided so that the movable rack 32 can move away from the fixed rack 31 in the heightwise direction. In this embodiment, the fixed rack 31 and the movable rack 32 are provided so that they can rotate through a shaft 38 extending left and right on the third surface side.

The second insulation displacement stand 10 constituted by an integral type insulation displacement stand will be described. The second insulation displacement stand 10 has a first surface for receiving the pressure-receiving surface 47 of the connector housing 41 of the insulation displacement connector 40, a second surface formed with a difference in level in the heightwise direction from the first surface so that the second surface can escape from the locking portion 48, a thirdsurface for receiving the connection surface 41*c* having the contact connection portions 44 opened in the connector housing 41, and a fourth surface for receiving the contact connection portion side in the surface 41*a* which is a surface of the connector housing 41 and from which the electric wire insertion holes 46 are opened. The first, second, third and fourth surfaces are formed up to opposite side end surfaces. The second insulation displacement stand 10 further has a braking unit 37'. The wire-out surface 41*d* is a surface of the connector housing 41. The electric wires 60 are drawn out from the connector housing 41. The wire-out surface 41*d* is pressed by the braking unit 37' to thereby press the connector housing 41 against the third surface. In the second insulation displacement stand 10, the first, second, third and fourth surfaces are formed up to the two side end surfaces, that is, left and right end surfaces of the second insulation displacement stand 10. The second insulation displacement stand 10 is equivalent to a first insulation displacement stand 7 except that the fixed rack and the movable rack are integrally provided with each other, that is, except that, in a first insulation displacement stand 7, the movable rack 32 is provided to be able to move away from the fixed rack 31 in the heightwise direction.

A wire guide and a punch are provided for each of the insulation displacement stands. That is, a first wire guide 8 and a first punch 9 are provided correspondingly with respect to the first insulation displacement stand 7. The first wire guide 8 is provided on a side opposite to the first insulation displacement stand 7 with respect to the electric wires 60 so that the first wire guide 8 moves back and forth relative to the first insulation displacement stand 7 to thereby lead end portions of the electric wires 60 onto the slots 45 of the insulation displacement connector 40. The first punch 9 is provided on a side opposite to the first insulation displacement stand 7 with respect to the electric wires 60 so that the first punch 9 moves back and forth relative to the first insulation displacement stand 7 to thereby force the end portions of the electric wires 60 into the slots 45 of the insulation displacement connector 40. A second wire guide 11 and a second punch 12 are provided correspondingly with respect to the second insulation displacement stand 10. The second wire guide 11 is provided on a side opposite to the second insulation displacement stand 10 with respect to the electric wires 60 so that the second wire guide 11 moves back and forth relative to the second insulation displacement stand 10 to thereby lead end portions of the electric wires 60 onto the slots 45 of the insulation displacement connector 40. The second punch 12 is provided on a side opposite to the second insulation displacement stand 10 with respect to the electric wires 60 so that the second punch 12 moves back and forth relative to the second insulation displacement stand 10 to thereby force the end portions of the electric wires 60 into the slots 45 of the insulation displacement connector 40. In this embodiment, because the first insulation displacement stand 7 is provided on the upper side of the electric wires 60, the first wire guide 8 and the first punch 9 are provided on the lower side of the electric wires 60. Further, because the second insulation displacement stand 10 is provided on the lower side of the electric wires 60, the second wire guide 11 and the second punch 12 are provided on the upper side of the electric wires 60. The wire guides 8 and 11 and the punches 9 and 12 can move back and forth individually relative to the insulation displacement stands 7 and 10 opposite to each other. That is, the first wire guide 8 and the first punch 9 are provided in the lower unit 6 so as to be movable up and down. A linking mechanism and an elevating mechanism such as a hydraulic cylinder, a pneumatic cylinder, etc. are connected to each of the first wire guide 8 and the first punch 9, so that the first wire guide 8 and the first punch 9 can be moved up and down from the lower unit 6 by means of the elevating mechanism. The second wire guide 11 and the second punch 12 are, on the other hand, are provided in the upper unit 5 so as to be movable up and down. A linking mechanism and an elevating mechanism such as a hydraulic cylinder, a pneumatic cylinder, etc. are connected to each of the second wire guide 11 and the second punch 12, so that the second wire guide 11 and the second punch 12 can be moved up and down by means of the elevating mechanism. Each of the wire guides 8 and 11 has a front end shaped like a comb. Cut end portions of the electric wires 60 are clamped and guided between teeth of the comb-like portion. Each of the punches 9 and 12 has a front end shaped like a comb. The position of the teeth is shifted left and right so as to be located between teeth of the comb-like portion in corresponding one of the wire guides 8 and 11. The electric wires 60 on the slots 45 of the insulation displacement connector 40 are pressed by the teeth of the comb-like portion respectively.

A cutting mechanism 13 for cutting the electric wires 60 is provided between the two insulation displacement stands 7 and 10. The cutting mechanism 13 has a cutting edge 13*a,* and a receptacle 13*b* for receiving the cutting edge 13*a*. At least one of the cutting edge 13*a* and the receptacle 13*b* is moved up or down to make the cutting edge 13*a* and the receptacle 13*b* close to or apart from each other so as to cut or release the electric wires 60. In this embodiment, the cutting edge 13*a* is provided in the upper unit 5 so as to be movable up and down. A linking mechanism and an elevating mechanism such as a hydraulic cylinder, a pneumatic cylinder, etc. are connected to the cutting edge 13*a,* so that the cutting edge 13*a* can be moved up and down from the upper unit 5 by the elevating mechanism. The receptacle 13*b* is, on the other hand, provided in the lower unit 6. Conversely, the cutting edge 13*a* may be provided on the lower side and the receptacle 13*b* may be provided on the upper side.

A wire supporter 17 is provided on the rear side of the first insulation displacement stand 7. The wire supporter 17 has a plate-like support member 17*a,* and a push rod 17*b* for pushing up the support member 17*a*. The support member 17*a* extends in the front-rear direction while the width of the support member 17 in the right-left direction is made substantially equal to that of the insulation displacement connector 40. A rear end of the support member 17*a* is supported by a shaft extending in the right-left direction, so that, when the push rod 17*b* extends, the support member 17*a* is pushed up by the push rod 17*b*. The wire supporter 17 is provided as occasion demands but is not an essential mechanism to the auto ID machine according to the present invention.

Figure 3:
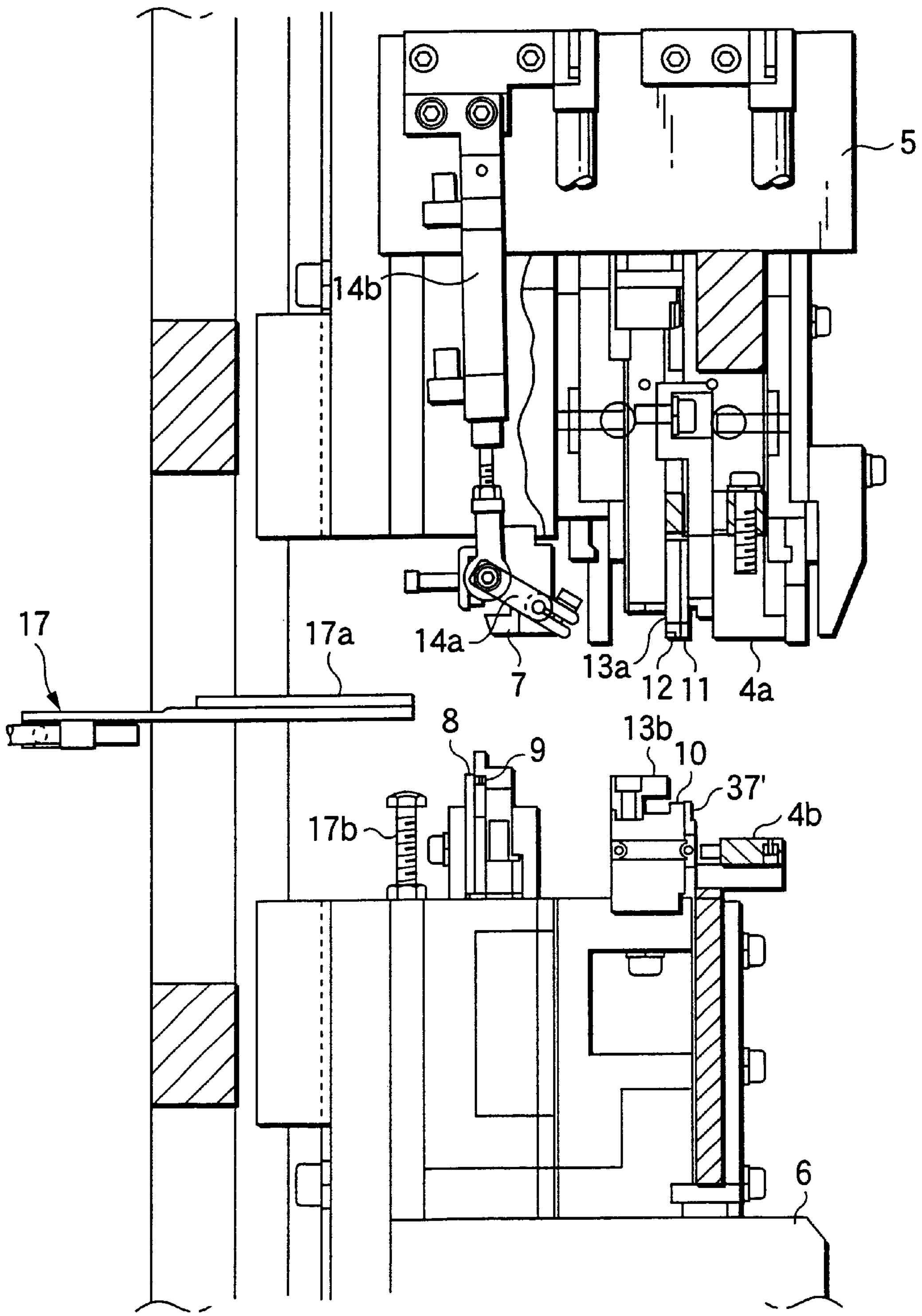
FIG. 3 is a vertical sectional side view of the upper and lower units.
Figure 4:
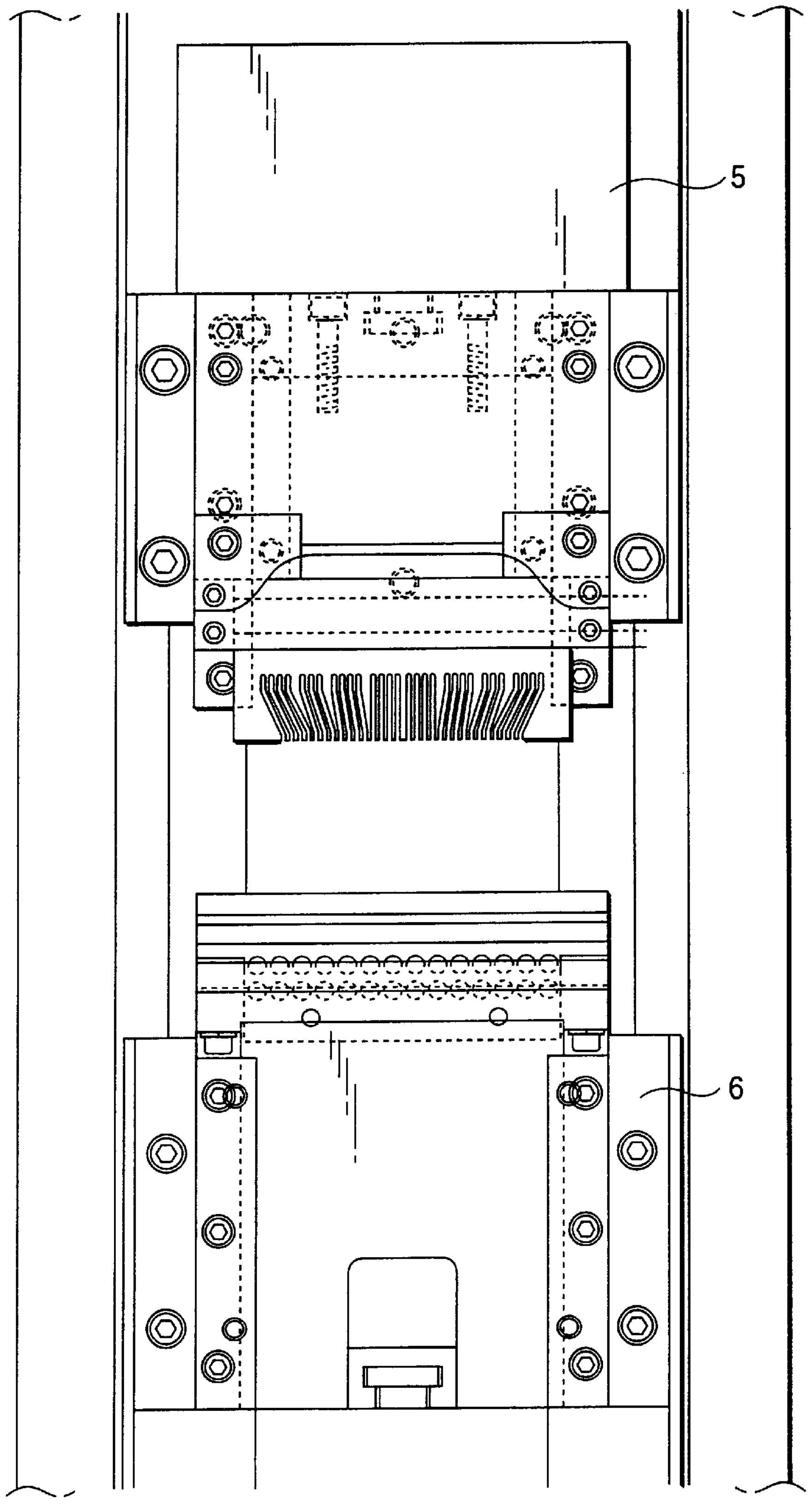
FIG. 4 is a view of the upper unit and the lower unit viewed from the rear side where a stationary chuck is provided along the direction of extending of electric wires.

The auto ID machine further has a movable rack driving mechanism 14. By the movable rack driving mechanism 14, the movable rack 32 of the first insulation displacement stand 7 constituted by a split type insulation displacement stand is retained in a regular position so as to be brought into contact with the insulation displacement connector 40 in a normal state and the movable rack 32 is rotated in a direction to move apart from the fixed rack 31 when insulation displacement is completed. As shown in FIGS. 3 and 5, the movable rack driving mechanism 14 has an arm 14*a* and a cylinder 14*b*. The arm 14*a* is provided at one end of a shaft 38 and extends in the direction of the radius of the shaft 38, while the cylinder 14*b* has a stretchable rod and is provided in the upper unit 5. A front end of the rod of the cylinder 14*b* is connected to an end portion of the arm 14*a,* opposite to the shaft 38. As described above, the movable rack driving mechanism 14 retains the movable rack 32 in a regular position to bring the movable rack 32 into contact with the insulation displacement connector 40 in accordance with the expansion and contraction of the rod of the cylinder 14b, or the movable rack driving mechanism 14 rotates the movable rack 32 in a direction to make the movable rack 32 apart from the fixed rack 31.

A connector charging unit 15 for charging the insulation displacement connector 40 in each of the insulation displacement stands 7 and 10 is provided on a side of the insulation displacement stand. The connector charging unit 15 has a first pusher 15*a,* a second pusher 15*b,* and a lifter 15*c.*Insulation displacement connectors 40 supplied from a parts feeder (not shown) are pushed one by one into the first insulation displacement stand 7 by the first pusher 15*a.* Insulation displacement connectors 40 supplied from the parts feeder are pushed one by one into the second insulation displacement stand 10 by the second pusher 15*b.* These pushers 15*a* and 15*b* are lifted up and down by the lifter 15*c.* As described preliminarily, the first, second, third and fourth surfaces 33 to 36 of the first insulation displacement stand 7 are formed up to at least end surfaces 31*a* and 32*a* on a side where the insulation displacement connectors 40 are charged, among the left and right end surfaces 31*a,* 32*a,* and 31*b,* 32*b* of the fixed and movable stands 31 and 32. Hence, a groove 39 extending in the right-left direction is formed by the first, second, third and fourth surfaces 33 to 36 of the first insulation displacement stand 7 (see FIG. 7(*a*)) . The connector charging unit 15 positions the insulation displacement connector 40 in a position for insulation displacement by inserting the insulation displacement connector 40 from one end of the groove 39 and sliding the insulation displacement connector 40 in the right-left direction before the electric wires 60 are connected with insulation displacement. Any connector charging unit can be used as the connector charging unit according to the present invention so long as the connector charging unit has a function of positioning the insulation displacement connector in a position for insulation displacement by inserting the insulation displacement connector from one end of the groove of the insulation displacement stand and sliding the insulation displacement connector in the right-left direction before the electric wires are connected with insulation displacement.

The stationary chuck 2, the movable chuck 3, the pressing chuck 4, the upper unit 5, the lower unit 6, the wire guides 8 and 11, the punches 9 and 12, the cutting mechanism 13, the movable rack driving mechanism 14 and the connector charging unit 15 are controlled by a control unit 16. The controlling is performed by the following procedure. While the movable chuck 3 clamps end portions of the electric wires 60 drawn out from the electric wire supplying unit 1 through the stationary chuck 2, the movable chuck 3 moves frontward and stops. While the electric wires 60 are strained and clamped by the stationary chuck 2 and the pressing chuck 4, the electric wires 60 are cut by the cutting mechanism 13. The first wire guide 8 is advanced so that the cut end portions of the electric wires 60 on the stationary chuck side are led onto the slots 45 of the insulation displacement connector 40 retained in the first insulation displacement stand 7. The first punch 9 is advanced so that the cut end portions are pushed into the slots 45. In parallel with this, the second wire guide 11 is advanced so that the cut end portions of the electric wires 60 on the movable chuck side are led onto the slots 45 of the insulation displacement connector 40 retained in the second insulation displacement stand 10. The second punch 12 is advanced so that the cut end portions are pushed into the slots 45. The wire guides 8 and 11 and the punches 9 and 12 are retreated so that the movable rack 32 is made apart from the fixed rack 31 in the first insulation displacement stand 7 by means of the movable rack driving mechanism 14. Incidentally, when the first insulation displacement stand 7 and the second insulation displacement stand 10 are provided so as to be movable up and down with respect to the upper and lower units 5 and 6 respectively, the elevating operations of the first and second insulation displacement stands 7 and 10 are also controlled by the control unit 16.

Figure 8:
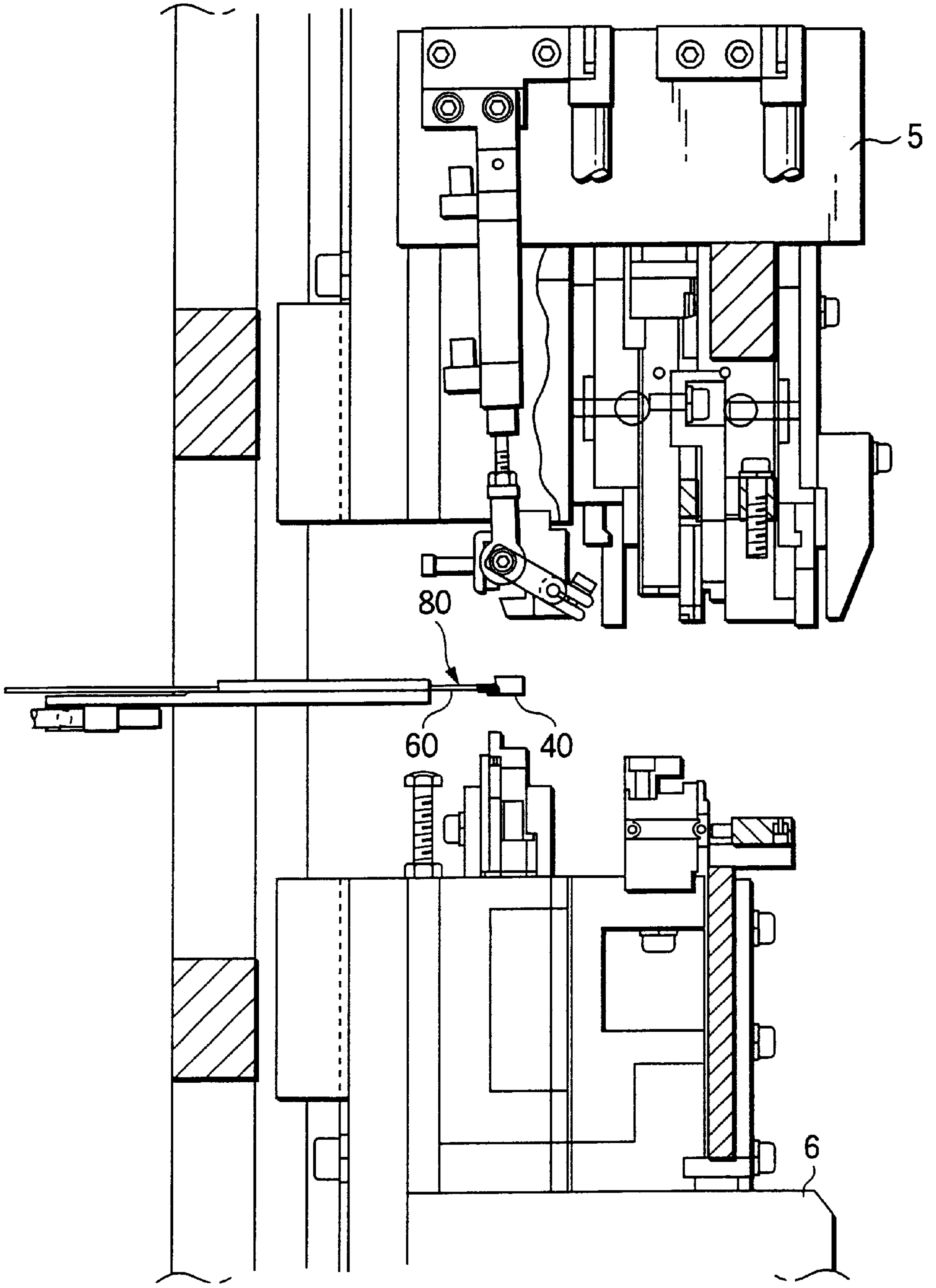
FIG. 8 is a vertical sectional side view of the upper and lower units when the respective portions of the auto ID machine are located in initial positions.
Figure 13:
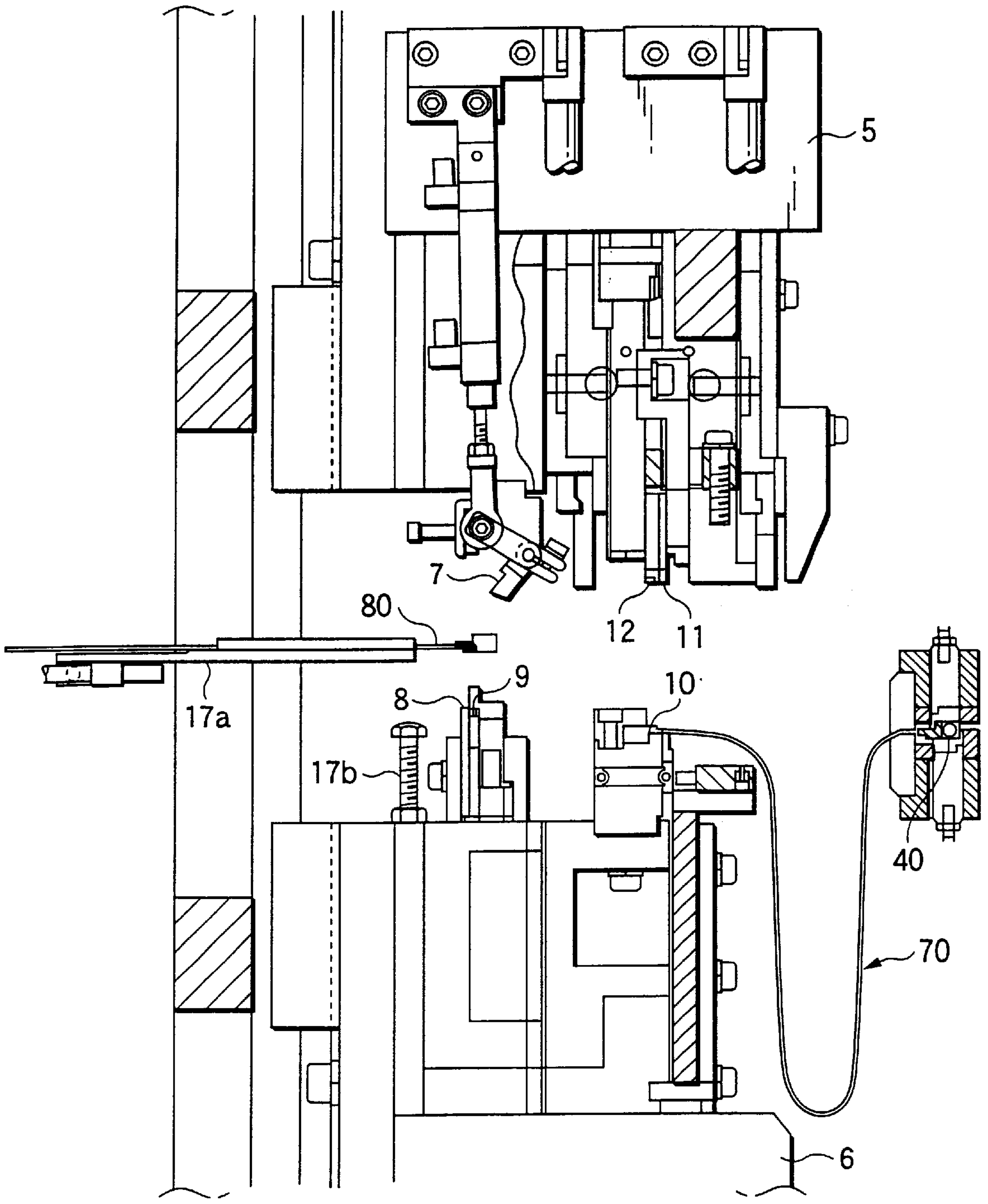
FIG. 13 is a vertical sectional side view of the upper and lower units when the insulation displacement connector including electric wires connected thereto with insulation displacement is released from the first insulation displacement stand.
Figure 14:
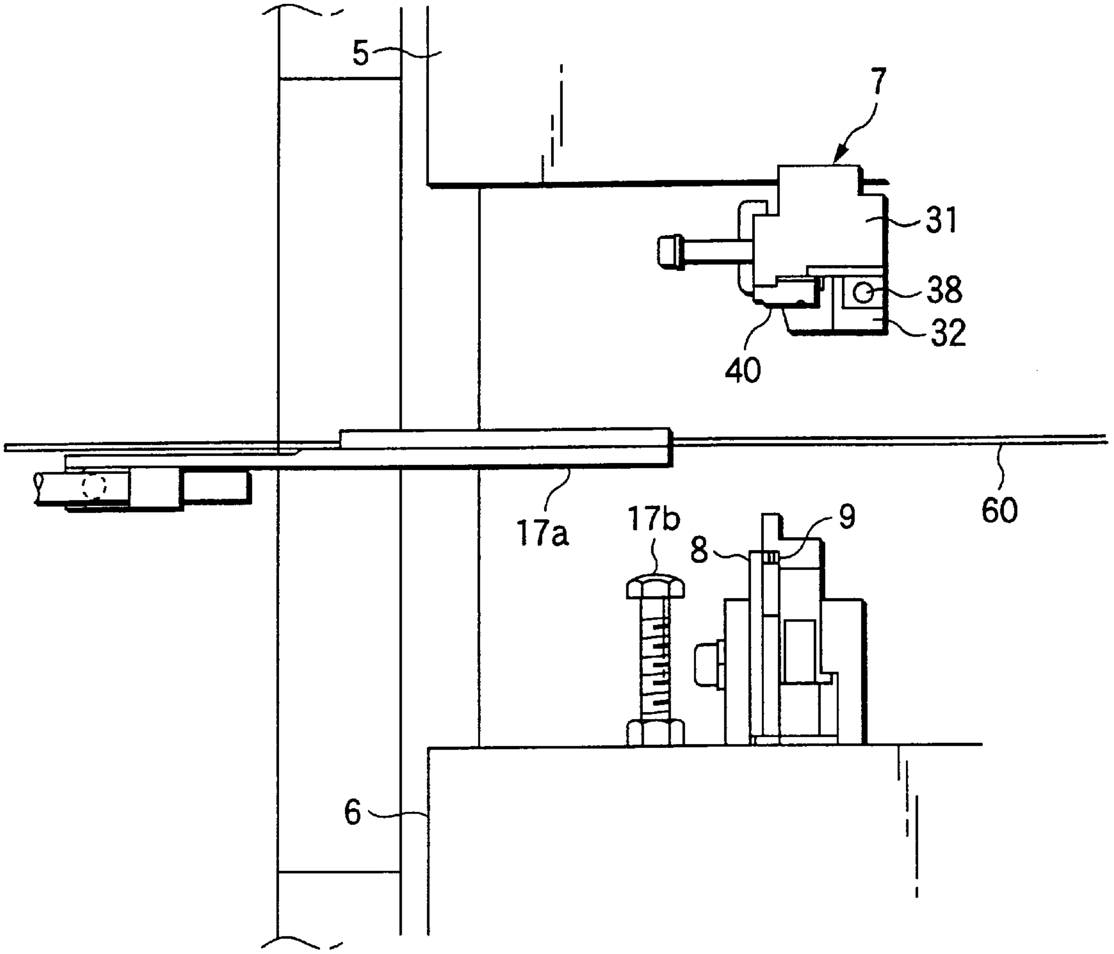
FIG. 14 is a side view of main part of the upper and lower units when respective portions are located in initial positions.

The operations of respective portions of the auto ID machine in accordance with this controlling will be described with reference to FIGS. 8 through 13 and FIGS. 14 through 18. FIGS. 8 and 14 show the state where the respective portions are located in their initial positions. That is, the upper and lower units 5 and 6 are apart from each other, so that the members 4*a* and 4*b* of the pressing chuck 4, the first insulation displacement stand 7, the first wire guide 8, the first punch 9, the second insulation displacement stand 10, the second wire guide 11, the second punch 12, the cutting edge 13*a* and the receptacle 13*b* of the cutting mechanism 13, etc. provided in these units 5 and 6 are apart from one another to be located in upper and lower portions so as to be in a stand-by state. A work half done (intermediate product) 80 in which the insulation displacement connector 40 is connected with insulation displacement to end portions of the electric wires 60 drawn out from the electric wire supplying unit 1 through the stationary chuck 2 is put on the wire supporter 17 between the upper and lower units 5 and 6.

Figure 9:
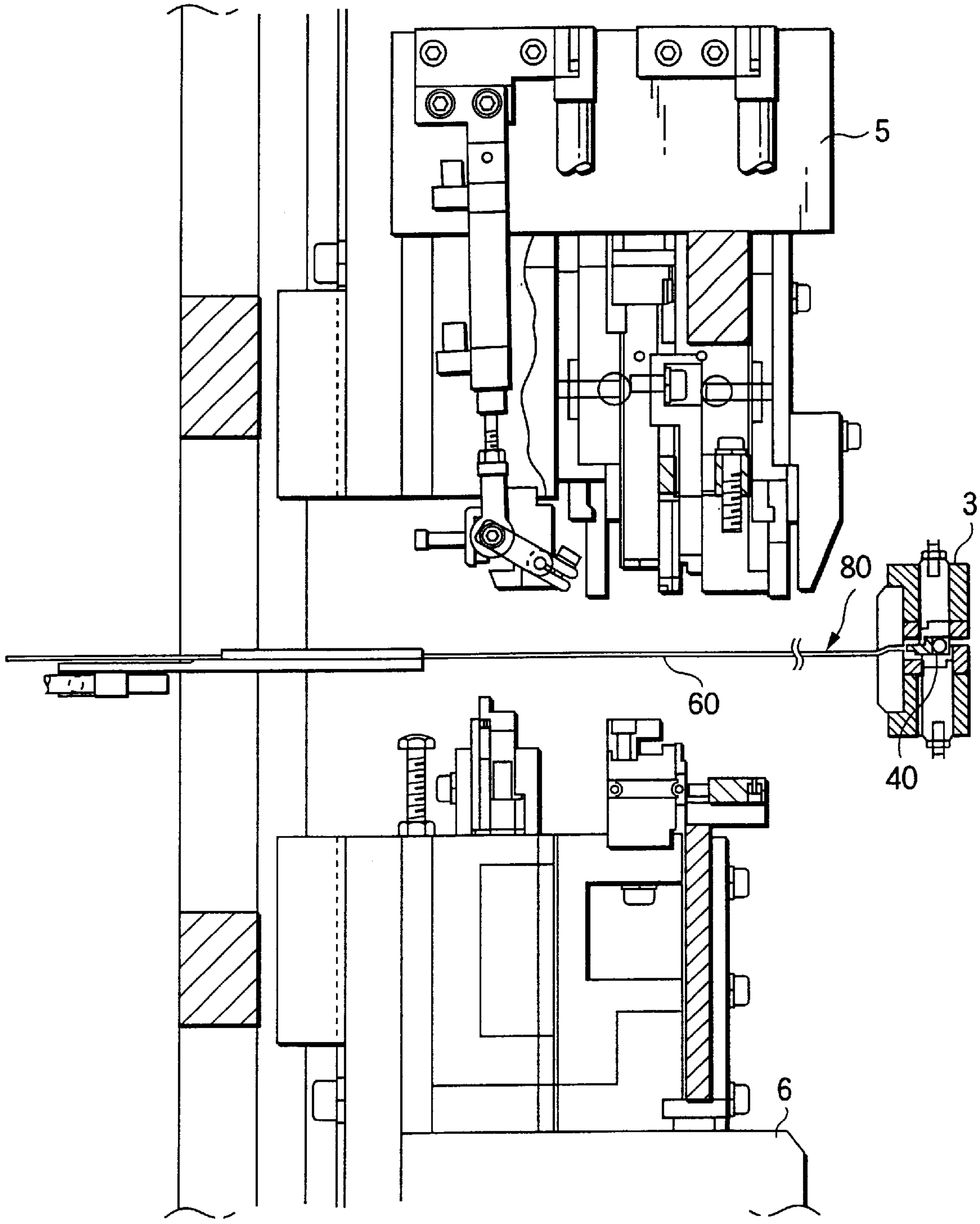
FIG. 9 is a vertical sectional side view of the upper and lower units in the auto ID machine when an end portion of work half done (intermediate product) is fed forward while clamped by the movable chuck.
Figure 10:
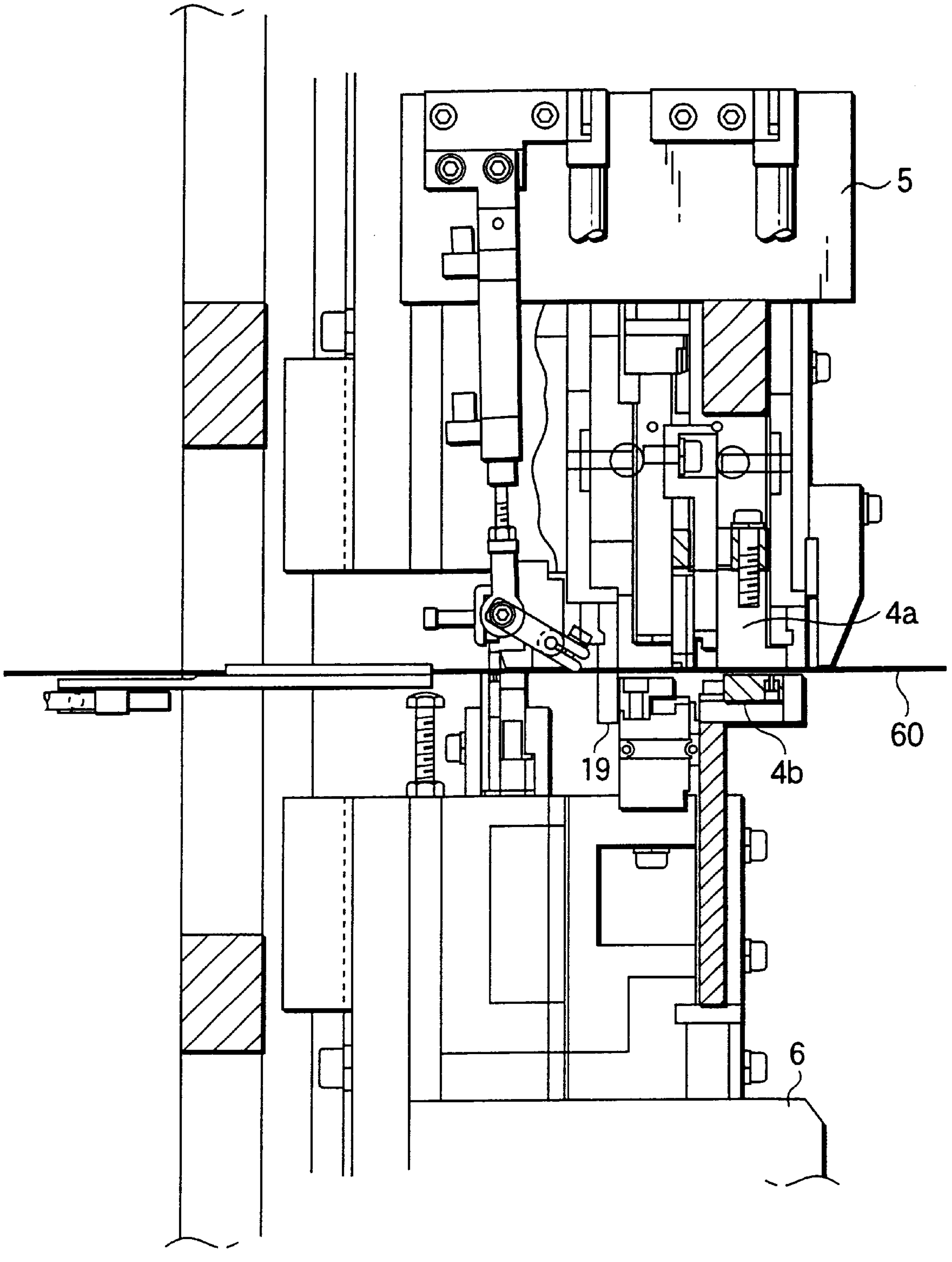
FIG. 10 is a vertical sectional side view of the upper and lower units when the upper unit moves down and the lower unit moves up so that the two units approach each other, and when the electric wires are clamped by the pressing chuck and the template moves down.
Figure 15:
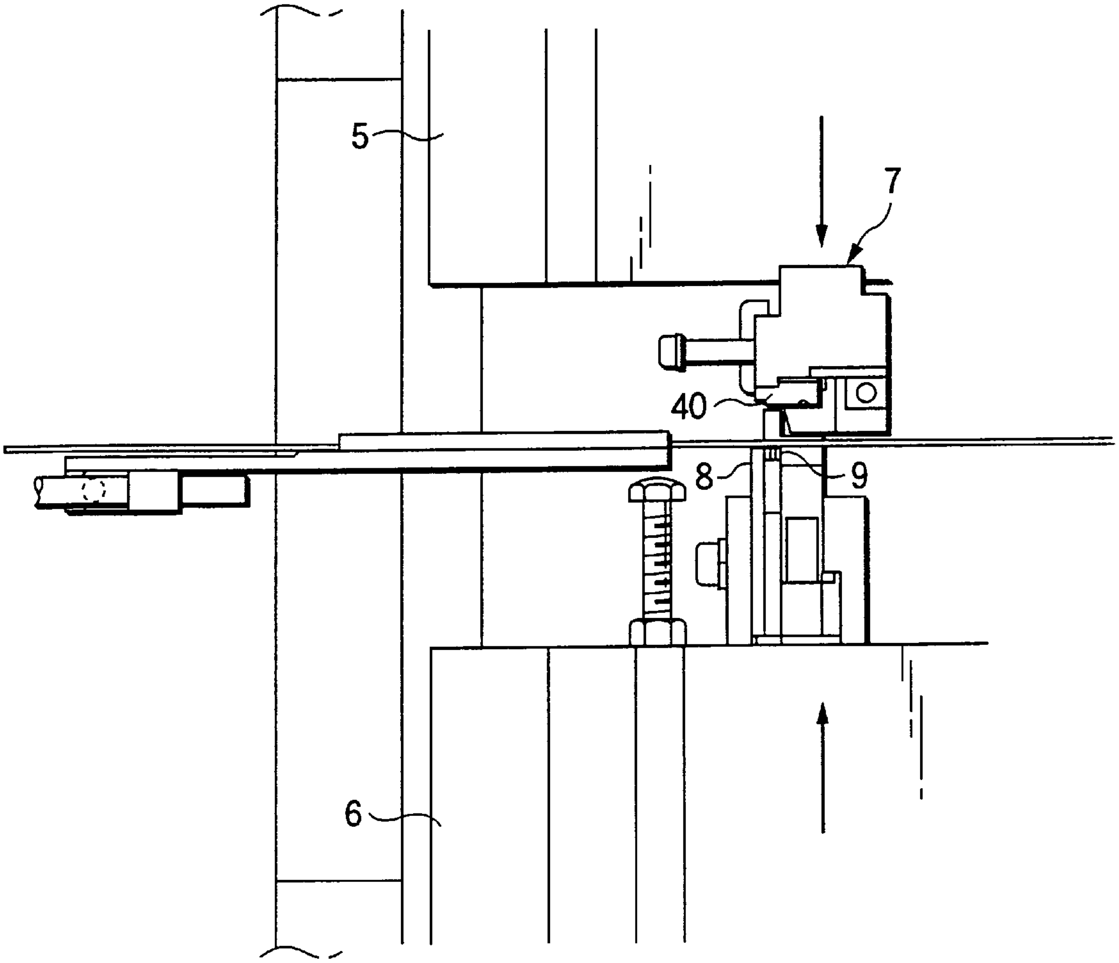
FIG. 15 is a side view of main part of the upper and lower units when the upper unit moves down and the lower unit moves up so that the two units approach each other.

Then, as shown in FIGS. 9 and 14, the end portion of the work half done 80 is clamped by the retreated movable chuck 3 and fed forward. The electric wires 60 of the work half done 80 are laid front and rear between the upper and lower units 5 and 6. Then, as shown in FIGS. 10 and 15, the upper unit 5 moves down and the lower unit 6 moves up, so that the two units 5 and 6 approach each other. Further, the electric wires 60 are clamped by the pressing chuck 4, so that the electric wires 60 are strained and clamped by the stationary chuck 2 and the pressing chuck 4. Further, a template 19 moves down so that the electric wires 60 are retained. The template 19 is provided in the upper unit 5 so as to be movable up and down. A linking mechanism and an elevating mechanism such as a hydraulic cylinder, a pneumatic cylinder, etc. are connected to the template 19, so that the template 19 can be moved up and down from the upper unit 5 by the elevating mechanism. The template 19 may be provided in the lower unit 6 or may be provided separately from the upper and lower units 5 and 6. The template 19 is provided as occasion demands but is not an essential mechanism to the auto ID machine according to the present invention.

Figure 11:
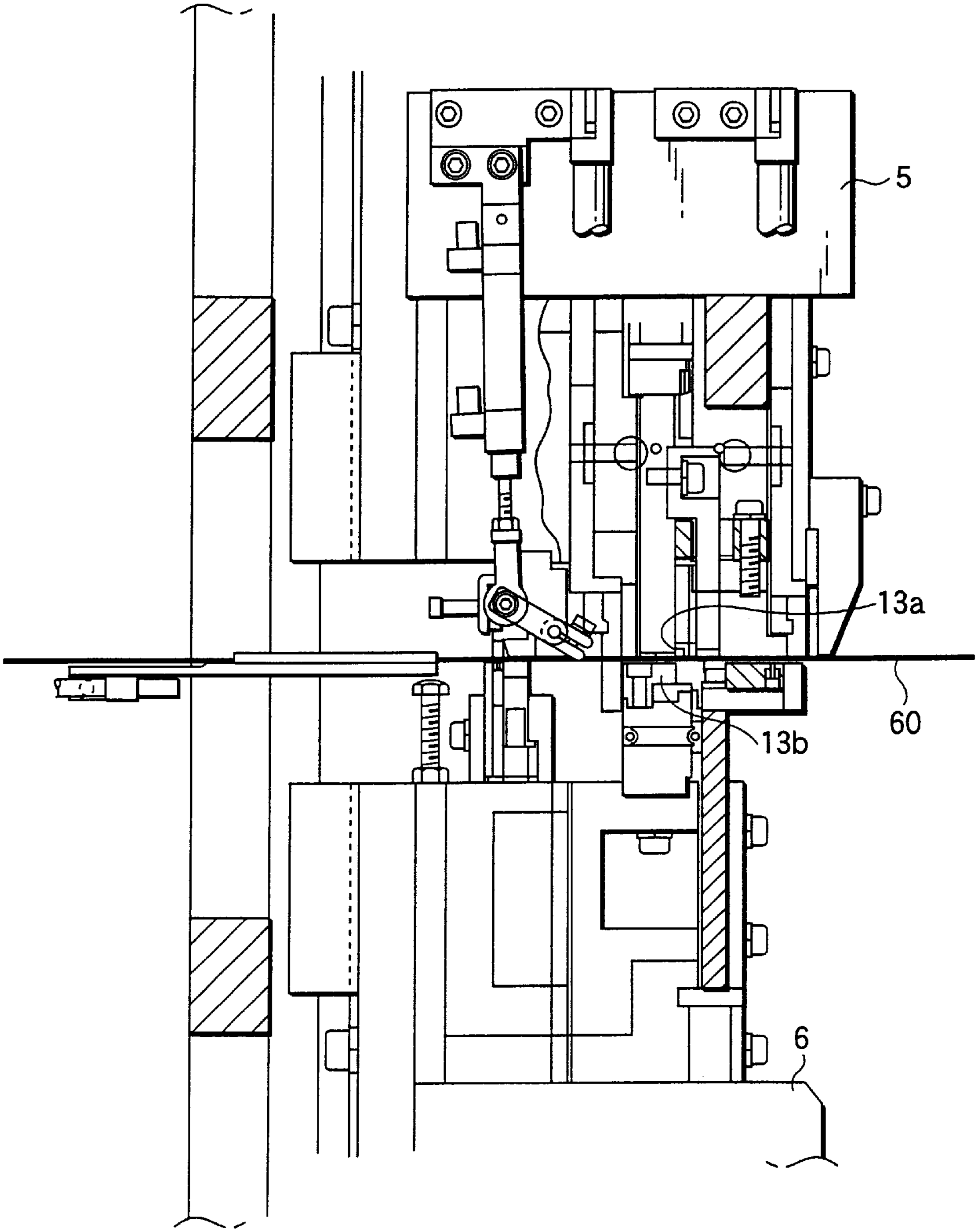
FIG. 11 is a vertical sectional side view of the upper and lower units when electric wires are cut by a cutting mechanism of the auto ID machine.

Further, as shown in FIG. 11, the electric wires 60 are cut by the cutting mechanism 13. In this state, as occasion demands, cut end portions of the electric wires 60 are moved in the front-rear direction so as to be positionally fitted to the slots 45 of the insulation displacement connector 40 retained in the insulation displacement stand. In this embodiment, the stationary-chuck-side cut end portions of the electric wires 60 on the rear side of the cutting edge 13*a* are slightly displaced rearward by the stationary chuck 2.

Figure 12:
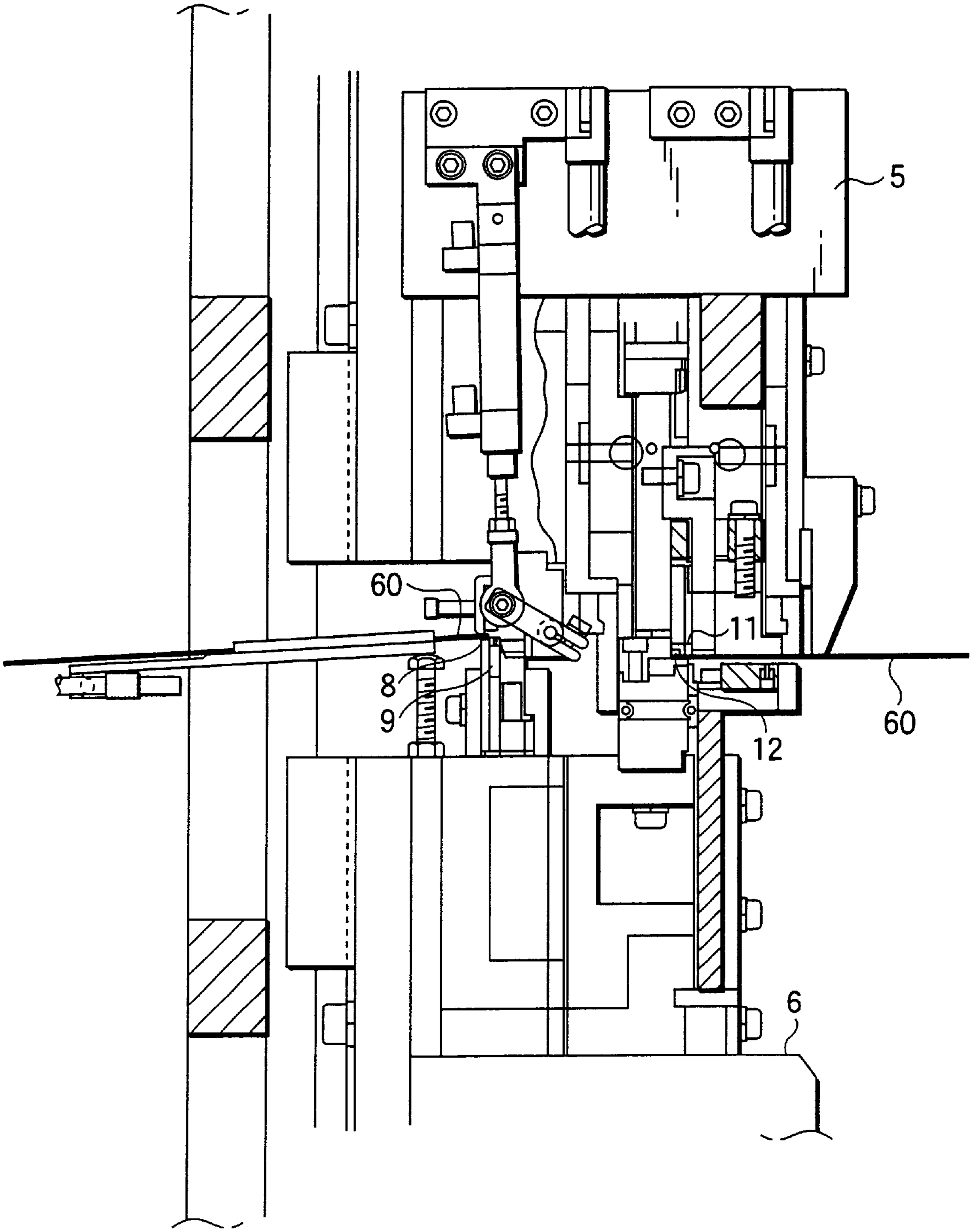
FIG. 12 is a vertical sectional side view of the upper and lower units when cores of the electric wires are connected to the insulation displacement connector with insulation displacement.
Figure 16:
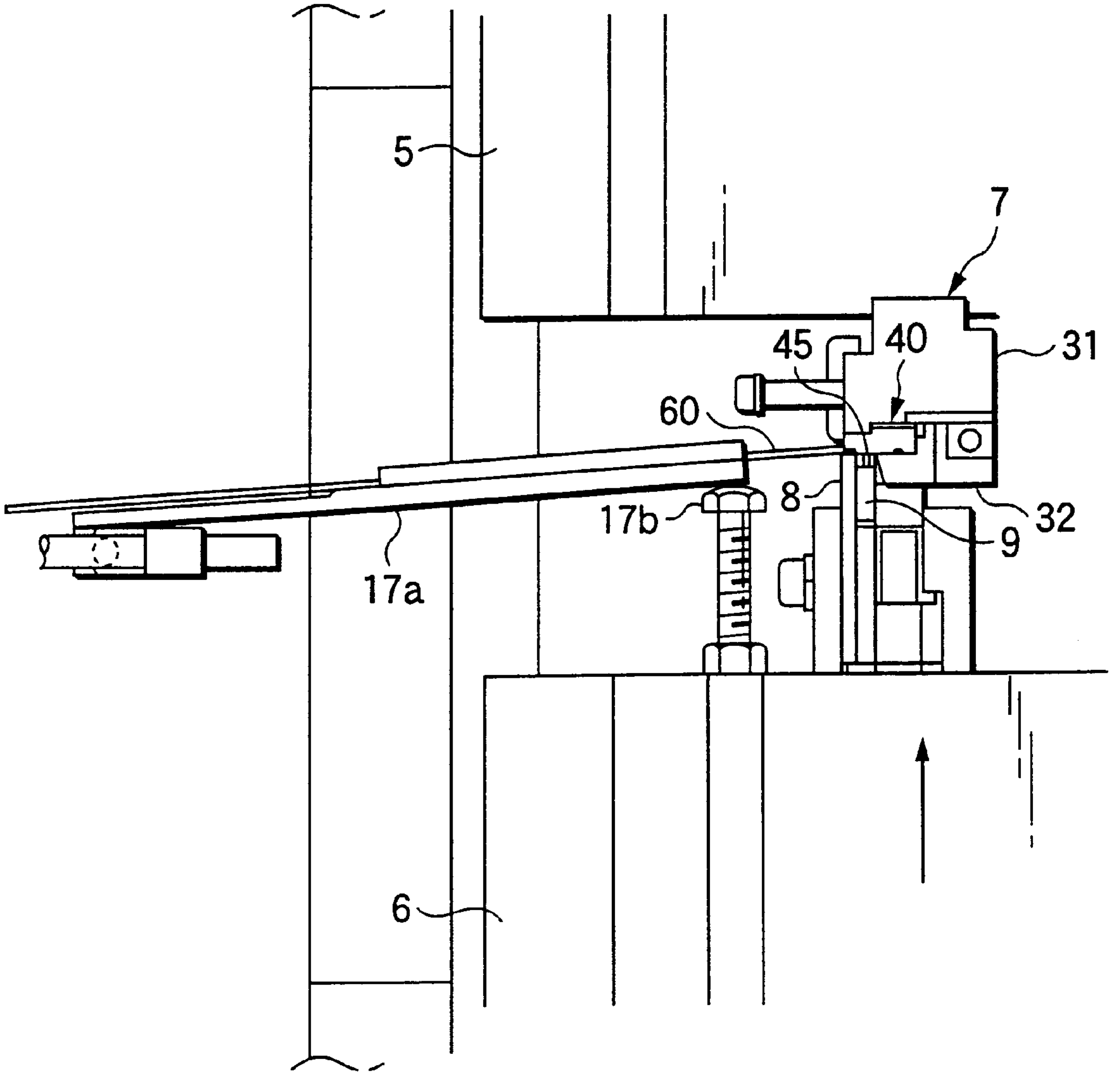
FIG. 16 is a side view of main part of the upper and lower units when cores of the electric wires are connected to the insulation displacement connector with insulation displacement.

Then, as shown in FIGS. 12 and 16, cores of the electric wires 60 are connected to the insulation displacement connector 40 with insulation displacement. That is, the first wire guide 8 is advanced so that the cut end portions of the electric wires 60 on the stationary chuck side are led onto the slots 45 of the insulation displacement connector 40 retained in the first insulation displacement stand 7. The first punch 9 is advanced so that the cut end portions of the electric wires 60 are pushed into the slots 45 and connected with insulation displacement. On this occasion, the support member 17a of the wire supporter 17 is being pushed up by the push rod 17*b* on the rear side of the first insulation displacement stand 7. On the other hand, the second wire guide 11 is advanced so that the cut end portions of the electric wires 60 on the movable chuck side are led onto the slots 45 of the insulation displacement connector 40 retained in the second insulation displacement stand 10. The second punch 12 is advanced so that the cut end portions of the electric wires 60 are pushed into the slots 45 and connected with insulation displacement.

Figure 17:
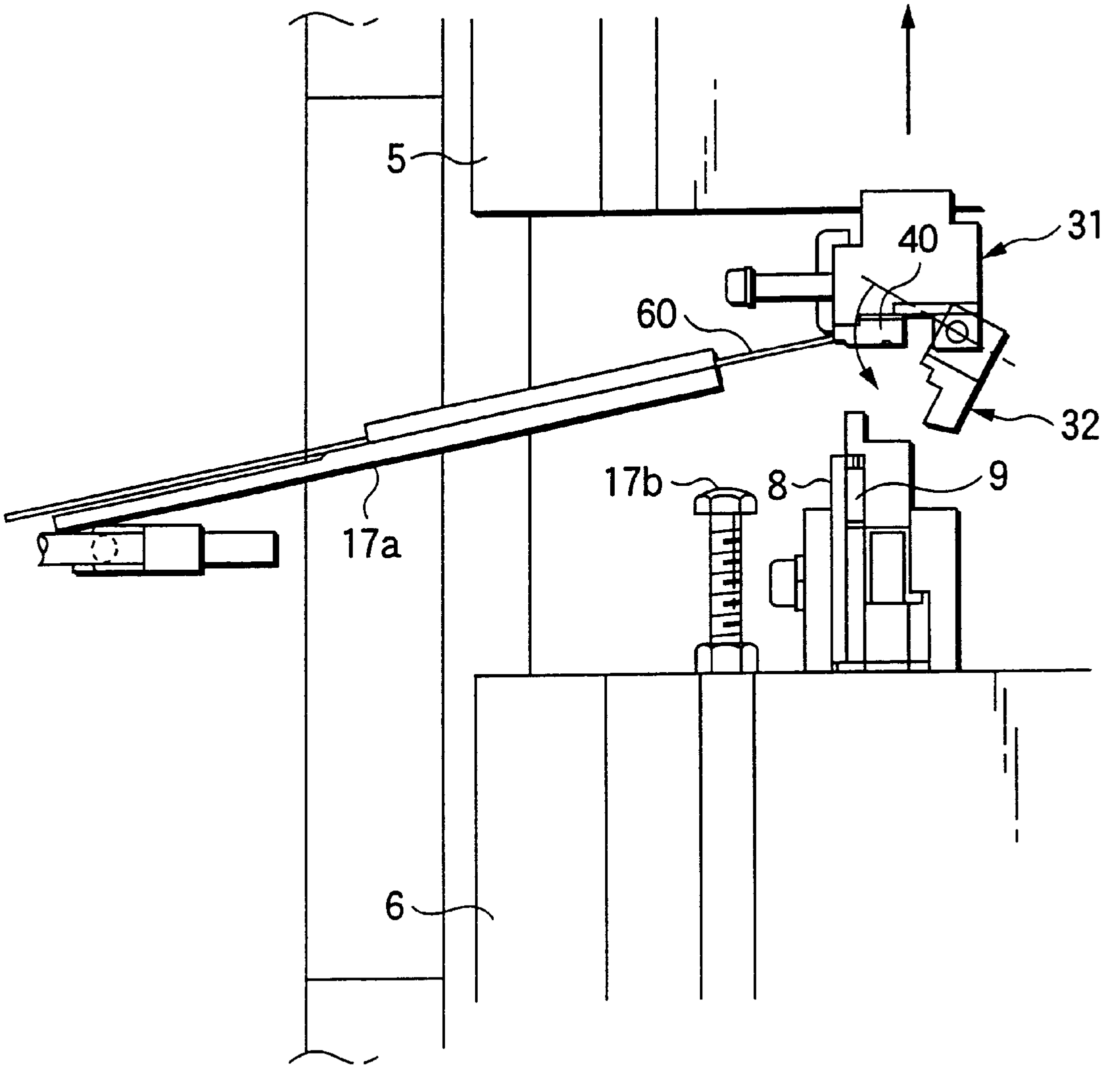
FIG. 17 is a side view of main part of the upper and lower units when a wire guide and a punch are retreated and the movable rack is made apart from the fixed rack in the first insulation displacement stand.
Figure 18:
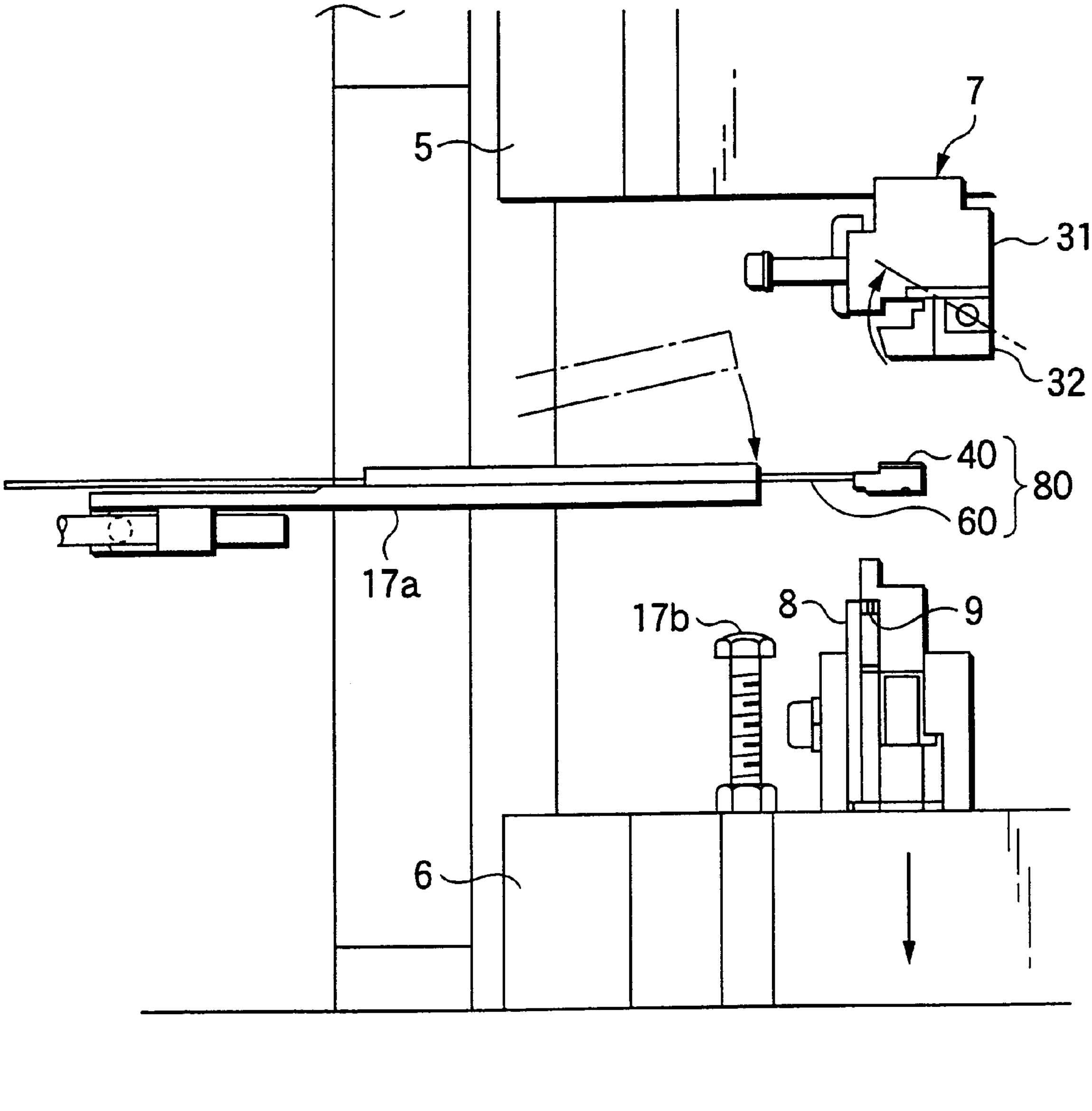
FIG. 18 is a side view of main part of the upper and lower units when the insulation displacement connector including the electric wires connected thereto with insulation displacement is released from the first insulation displacement connector.

Then, after the completion of insulation displacement, the insulation displacement connector 40 including the electric wires connected with insulation displacement is released from the first insulation displacement stand 7 constituted by a split type insulation displacement stand. That is, as shown in FIG. 17, when the first wire guide 8 and the first punch 9 are retreated so that the movable rack 32 is moved apart from the fixed rack 31 of the first insulation displacement stand 7 by means of the movable rack driving mechanism 14, the insulation displacement connector 40 to which the cut end portions of the electric wires 60 on the stationary chuck side are connected with insulation displacement is released from the first insulation displacement stand 7. On this occasion, as shown in FIGS. 17 and 18, the push rod 17*b* is retreated on the rear side of the first insulation displacement stand 7. Hence, the wire supporter 17 is moved down by its own weight, so that the insulation displacement connector 40 unsupported is made to fall down by its own weight. In this manner, as shown in FIGS. 13 and 18, the work half done 80 in which the insulation displacement connector 40 is connected with insulation displacement to the one-end portions of the electric wires 60 is put on the wire supporter 17. At the same time, the second wire guide 11 and the second punch 12 are retreated. Thus, a connector 70 including an electric wire in which insulation displacement connectors 40 are connected to opposite end portions of the electric wires 60 is completed. The insulation displacement connectors 40 at the opposite ends of the connector 70 including the electric wire are pushed out toward a side from the second insulation displacement stand 10 and the movable chuck 3 and fed to an next-step apparatus (not shown) such as a current conduction test apparatus provided on the side of the second insulation displacement stand 10 and the movable chuck 3. In this apparatus, a current conduction test is performed between the insulation displacement connectors 40 at the opposite ends. The work of pushing out the insulation displacement connectors 40 from the second insulation displacement stand 10 is performed by the second pusher 15*b* provided in the connector charging unit 15 described preliminarily. The work of pushing out the insulation displacement connectors 40 from the movable chuck 3 is performed by a third pusher (not shown) additionally provided in the connector charging unit 15. Thereafter, the aforementioned operations of the respective portions of the auto ID machine are repeated.

Figure 7A:
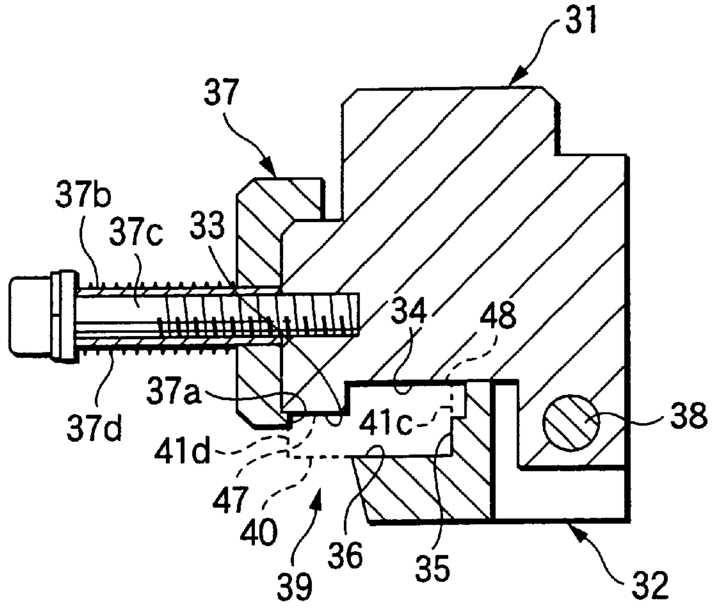
FIGS. 7(*a*) and 7(*b*) are sectional views of the first insulation displacement stand, (*a*) showing the case where the movable rack is located in a regular position, (*b*) showing the case where the movable rack is moved apart from the fixed rack.
Figure 7B:
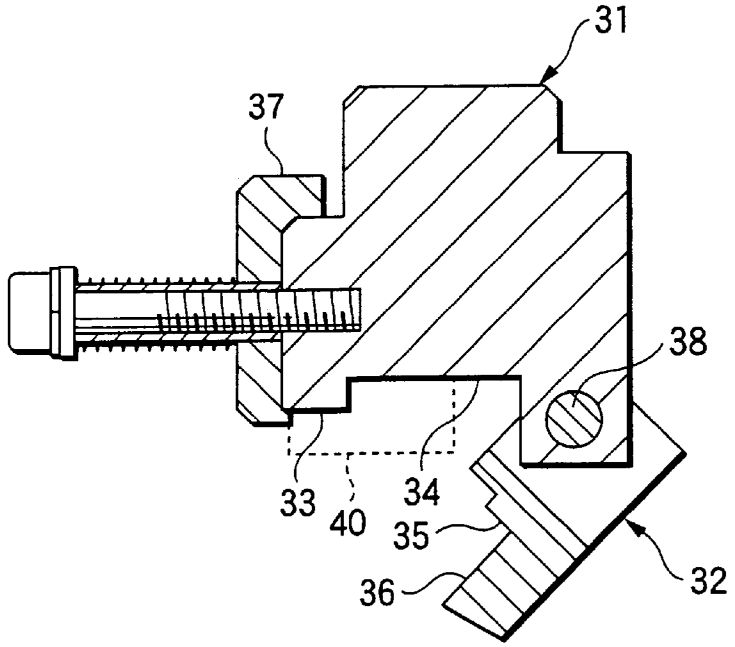

Hence, in the first embodiment, as shown in FIG. 7(*a*), an insulation displacement load received on the pressure-receiving surface 47 of the connector housing 41 is caught by the first surface 33 of the first insulation displacement stand 7 at the time of insulation displacement. The locking portion 48 is allowed to escape by the difference in level between the first and second surfaces 33 and 34. The connector housing 41 is positioned in the front-rear direction by the third surface 35 and the braking unit 37. The fourth surface 36 prevents the connector housing 41 from floating up from the first insulation displacement stand 7. As shown in FIG. 7(*b*), if the movable rack 32 is made apart from the fixed rack 31 in the heightwise direction after connecting the electric wires 60 to the insulation displacement connector 40 with insulation displacement is completed, the insulation displacement connector 40 is not restricted by the third and fourth surfaces 35 and 36 but is pulled in the direction of extending of the electric wires 60. Accordingly, the insulation displacement connector 40 is released from the first insulation displacement stand 7. Hence, when this split type insulation displacement stand is attached to a conventional auto ID machine, insulation displacement and release of an insulation displacement including a locking portion connector 40 can be performed smoothly.

The present invention includes all embodiment of the split type insulation displacement stand which is designed to be divided into a fixed rack and a movable rack so that the movable rack can be made apart from the fixed rack in the heightwise direction. Hence, the present invention includes, for example, an embodiment in which the movable rack is provided so that the movable rack can slide vertically relative to the fixed rack. However, when the fixed rack 31 and the movable rack 32 are provided so as to be rotatable around the shaft 38 extending in the right-left direction on the third surface side, the split type insulation displacement stand 7 can be achieved by a simple structure. The present invention includes an embodiment obtained by combination of these embodiments, that is, an embodiment in which the movable rack is provided so as to be vertically slidable relative to the fixed rack and, further, in which the fixed rack and the movable rack are provided so as to be rotatable around the shaft extending in the right-left direction on the third surface side. In the aforementioned embodiment, for example, a shaft bearing hole of the fixed rack may be formed to be a long hole so that, when the movable rack is moved apart from the fixed rack in the heightwise direction, the shaft 38 moves in a direction to escape from the insulation displacement connector (frontward in the first mode). If so, the insulation displacement connector can be released more smoothly because the third surface 35 is moved apart from the connection surface 41*c* of the insulation displacement connector 40 rapidly when the movable rack is moved apart from the fixed rack.

In the aforementioned embodiment, the first insulation displacement stand 7 is disposed on the upper side of the electric wires 60 and the second insulation displacement stand 10 is disposed on the lower side of the electric wires 60. The arrangement of the insulation displacement stands is determined on the basis of the direction in which the insulation displacement connector is connected to the electric wires with insulation displacement. Therefore, the present invention includes all embodiments in which the arrangement of the first insulation displacement stand on the upper side of the electric wires, the arrangement of the first insulation displacement stand on the lower side of the electric wires, the arrangement of the second insulation displacement stand on the upper side of the electric wires and the arrangement of the second insulation displacement stand on the lower side of the electric wires are combined suitably.

In the split type insulation displacement stand 7 according to the aforementioned embodiment, the first and second surfaces 33 and 34 are formed to be the fixed rack 31, and the third and fourth surfaces 35 and 36 are formed to be the movable rack 32. The present invention includes a modification in which the first, second and third surfaces are formed to be the fixed rack and the fourth surface is formed to be the movable rack. The split type insulation displacement stand according to this modification is a split type insulation displacement stand including a fixed rack, a movable rack, and a braking unit in the following manner. A first surface for receiving a pressure-receiving surface of a connector housing, and a second surface to escape from a locking portion are formed in the fixed rack with a difference in level in the heightwise direction. A third surface for receiving a connection surface of the connector housing having contact connection portions opened is further formed in the fixed rack. The first, second and third surfaces are formed up to at least one side end surface on the side where the insulation displacement connector is charged. A fourth surface for receiving the contact connection portion side in a surface of the connector housing having the electric wire insertion holes opened is formed in the movable rack so as to reach at least one side end surface on the side where the insulation displacement connector is charged. The braking unit is provided in the fixed rack so that the surface of the connector housing from which the electric wires are drawn out is pressed so as to press the connector housing against the third surface. The movable rack is provided so that the movable rack can be made apart from the fixed rack in the heightwise direction. Also in this modification, a insulation displacement load received on the pressure-receiving surface of the connector housing is caught by the first surface of the split type insulation displacement stand at the time of insulation displacement. The locking portion is escaped due to the difference in level between the first and second surfaces. The positioning of the connector housing in the front-rear direction is performed by the third surface and the braking unit. The fourth surface prevents the connector housing from floating up from the split type insulation displacement stand. When insulation displacement of the electric wires to the insulation displacement connector is completed, the insulation displacement connector is not restricted by the fourth surface if the movable rack is moved apart from the fixed rack in the heightwise direction. Hence, the insulation displacement connector is pulled in the direction of extending of the electric wires, so that the insulation displacement connector is released from the split type insulation displacement stand. Hence, if the split type insulation displacement stand is attached to a conventional auto ID machine, insulation displacement and release of an insulation displacement connector including a locking portion can be performed smoothly. As the form of the movable rack which is provided so that the movable rack can be made apart from the fixed rack in the heightwise direction, for example, the fixed rack and the movable rack may be provided so as to be rotatable around the shaft extending in the right-left direction on the third surface side, or the movable rack may be provided so as to be vertically slidable relative to the fixed rack, or these arrangements may be used in combination, as described above in the aforementioned embodiment for carrying out the invention.

In the first embodiment, the first insulation displacement stand is formed to be a split type insulation displacement stand and the second insulation displacement stand more front than the first insulation displacement stand is formed to be an integral type insulation displacement stand. The present invention includes, as other embodiments, a second embodiment in which, for example, a first insulation displacement stand is formed to be a split type insulation displacement stand, and a second insulation displacement stand more front than the first insulation displacement stand is also formed to be a split type insulation displacement stand; and a third embodiment in which a insulation displacement stand is provided as a single stand and as a split type insulation displacement stand.

Figure 22:
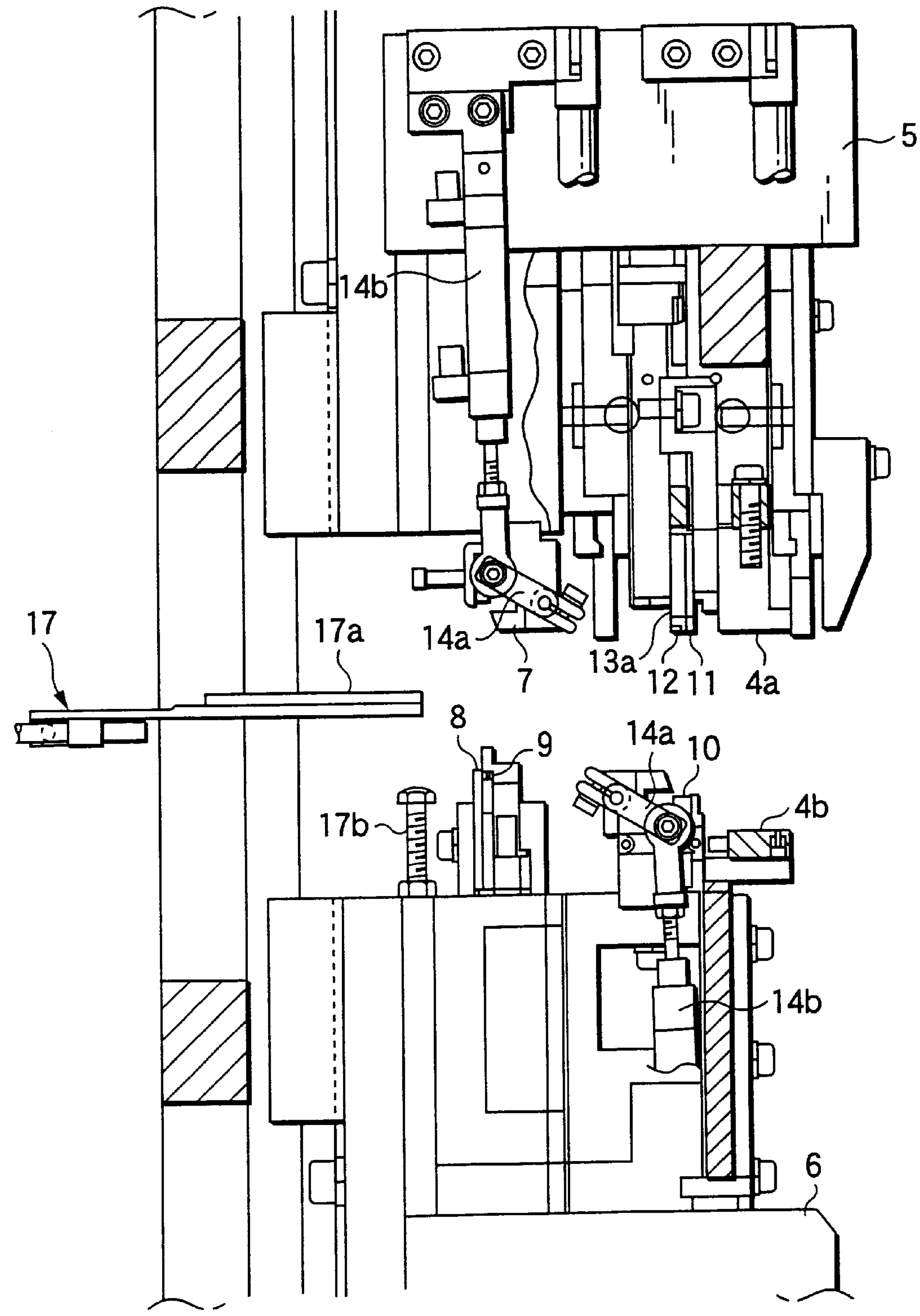
FIG. 22 is a vertical sectional side view of the upper and lower units in the auto ID machine according to a second embodiment of the present invention.

The configurations of the second and third embodiments and operations and effects obtained by the second and third embodiments are basically the same as those of the first embodiment. Hence, the description which has been made above about the first embodiment is directly applied to the description for the second and third embodiments. Of those embodiments, the configuration, operation and effect of the second mode are different from those of the first embodiment as follows. FIG. 22 shows an auto ID machine according to the second embodiment. The second insulation displacement stand 10 is a split type insulation displacement stand having the same configuration as the first insulation displacement stand 7 but is reverse to the first insulation displacement stand 7 in the front-rear direction. That is, insulation displacement connectors 40 to be charged into the two insulation displacement stands 7 and 10 respectively are reverse to each other in the front-rear direction. The auto ID machine further has a movable rack driving mechanism 14 for the second insulation displacement stand 10. The configuration of the movable rack driving mechanism 14 is the same as that of the movable rack driving mechanism 14 described preliminarily for the first insulation displacement stand 7, except that the cylinder 14*b* is provided in the lower unit 6 to which the second insulation displacement stand 10 is attached. Incidentally, the first and second insulation displacement stands 7 and 10 may be interlocked with each other by one movable rack driving mechanism. Hence, when the reference numerals in the first embodiment are used directly, the configuration of the second embodiment is an auto ID machine having split type insulation displacement stands, which includes: an electric wire supplying unit 1; a stationary chuck 2; a movable chuck 3; a pressing chuck 4; a first insulation displacement stand 7 constituted by a split type insulation displacement stand between the stationary chuck 2 and the pressing chuck 4 and having a first surface 33 provided on an upper or lower side of electric wires 60 so that the first surface 33 faces the electric wires 60; a second insulation displacement stand 10 constituted by a split type insulation displacement stand located in front of the first insulation displacement stand 7 between the stationary chuck 2 and the pressing chuck 4 and having a first surface 33 provided on an upper or lower side of the electric wires 60 so that the first surface 33 faces the electric wires 60; movable rack driving mechanisms 14 for the insulation displacement stands 7 and 10 respectively; a first wire guide 8 for the first insulation displacement stand 7; a first punch 9 for the first insulation displacement stand 7; a second wire guide 11 for the second insulation displacement stand 10; a second punch 12 for the second insulation displacement stand 10; a cutting mechanism 13; a connector charging unit 15 for charging insulation displacement connectors 40 in the two insulation displacement stands 7 and 10; and a control unit 16 for controlling the movable chuck 3 to move forward and stop while the movable chuck 3 clamps end portions of the electric wires 60 drawn out from the electric wire supplying unit 1 through the stationary chuck 2, controlling the stationary chuck 2 and the pressing chuck 4 to strain and clamp the electric wires 60, controlling the cutting mechanism 13 to cut the electric wires 60, controlling the first wire guide 8 to advance so as to lead the stationary-chuck-side cut end portions of the electric wires 60 onto slots 45 of the insulation displacement connector 40 retained in the first insulation displacement stand 7, controlling the first punch 9 to advanced so as to push the cut end portions of the electric wires 60 into the slots 45, controlling the second wire guide 11 to advance in parallel with the controlling of the first punch 9 so as to lead the movable-chuck-side cut end portions of the electric wires 60 onto slots 45 of the insulation displacement connector 40 retained in the second insulation displacement stand 10, controlling the second punch 12 to advance so as to push the cut end portions of the electric wires 60 into the slots 35, controlling the two wire guides 8 and 11 and the two punches 9 and 12 to retreat, and controlling each of the movable rack driving mechanisms 14 to make the movable rack 32 apart from the fixed rack 31 in each of the insulation displacement stands 7 and 10. When insulation displacement is completed in the auto ID machine, one insulation displacement connector 40 is released from the first insulation displacement stand 7 and, at the same time, another insulation displacement connector 40 is also released from the second insulation displacement stand 10. That is, when the second wire guide 11 and the second punch 12 are retreated, and the movable rack 32 is made apart from the fixed rack 31 in the second insulation displacement stand 10 by the movable rack driving mechanism 14, the insulation displacement connector 40 to which the movable-chuck-side cut end portions of the electric wires 60 are connected with insulation displacement is released from the second insulation displacement stand 10. When, for example, the electric wires 60 are then pulled by the movable chuck 3, the connector 70 including an electric wire with the insulation displacement connectors 40 attached to the opposite end portions of the electric wires 60 is released. Unlike the first embodiment, the second embodiment is adapted to the case where the connector 70 including an electric wire is not automatically fed to the next-step apparatus such as a current conduction test apparatus. Thereafter, the above operations of the respective portions of the auto ID machine are repeated.

The configuration, operation and effect of the third embodiment are different from those of the first embodiment as follows. The first insulation displacement stand 7 is provided but there is no second insulation displacement stand 10. Correspondingly, there is no second wire guide 11, no second punch 12 and no second pusher 15b in the connector charging unit 15. Hence, when the reference numerals in the first embodiment are used directly, the configuration of the third embodiment is an auto ID machine having a split type insulation displacement stand, which includes: an electric wire supplying unit 1; a stationary chuck 2; a movable chuck 3; a pressing chuck 4; a first insulation displacement stand 7 constituted by a split type insulation displacement stand between the stationary chuck 2 and the pressing chuck 4 and provided on an upper or lower side of electric wires 60; a movable rack driving mechanism 14; a first wire guide 8; a first punch 9; a cutting mechanism 13; a connector charging unit 15; and a control unit 16 for controlling the movable chuck 3 to move forward and stop while the movable chuck 3 clamps end portions of the electric wires 60 drawn out from the electric wire supplying unit 1 through the stationary chuck 2, controlling the stationary chuck 2 and the pressing chuck 4 to strain and clamp the electric wires 60, controlling the cutting mechanism 13 to cut the electric wires 60, controlling the first wire guide 8 to advance so as to lead the cut end portions of the electric wires 60 onto slots 45 of the insulation displacement connector 40 retained in the first insulation displacement stand 7, controlling the first punch 9 to advance so as to push the cut end portions of the electric wires 60 into the slots 45, controlling the first wire guide 8 and the first punch 9 to retreat, and controlling the movable rack driving mechanism 14 to make the movable rack 32 apart from the fixed rack 31 in the first insulation displacement stand 7. In the auto ID machine, when insulation displacement is completed, the insulation displacement connector 40 is released only from the first insulation displacement stand 7. When the electric wires 60 as the work half done 80 are cut by the cutting mechanism 13, a single-side connector including an electric wire in which the insulation displacement connector 40 is connected with insulation displacement only to one end of the electric wires 60 is completed. Thereafter, the above operations of the respective portions of the auto ID machine are repeated.

The description made about the split type insulation displacement stand in the first embodiment is directly applied also to the second and third embodiment.

In the split type insulation displacement stand according to the first aspect of the invention, the insulation displacement stand is divided into a fixed rack and a movable rack which are provided so that the movable rack can be made apart from the fixed rack in the heightwise direction. Hence, when the split type insulation displacement stand is attached to a conventional auto ID machine, insulation displacement and release of a insulation displacement connector including a locking portion can be performed smoothly.

According to the second aspect of the invention, the provision of the movable rack which is provided so that the movable rack can be made apart from the fixed rack in the heightwise direction can be achieved by a simple structure.

In the auto ID machine having a split type insulation displacement stand according to the third aspect of the invention, insulation displacement and release of an insulation displacement connector including a locking portion can be performed automatically and smoothly.

In the auto ID machine having a split type insulation displacement stand according to the fourth aspect of the invention, insulation displacement of insulation displacement connectors including a locking portion to each of opposite ends of electric wires and release of the insulation displacement connectors can be performed automatically and smoothly.

In the auto ID machine having a split type insulation displacement stand according to the fifth aspect of the invention, a series of work of connecting insulation displacement connectors including a locking portion to opposite ends of electric wires and feeding the connectors to a next step such as a current conduction test etc., can be performed automatically and smoothly.

While only certain embodiments of the invention have been specifically described herein, it will be apparent that numerous modifications may be made thereto without departing from the spirit and scope of the invention.

What is claimed is:

1. An insulation displacement stand for an automatic insulation displacement machine for connecting a core of an electric wire to an insulation displacement connector with insulation displacement, the insulation displacement connector including: a connector housing having a cavity piercing the connector housing in a front-rear direction; and a contact having a connection portion at a first end and a slot for connecting the core of the electric wire on one of upper and lower surfaces thereof on a side of a second end, the contact being inserted in the cavity of the connector housing, wherein the connector housing includes an electric wire insertion hole opened on one of upper and lower surfaces of the connector housing so as to communicate with the slot of the contact, a pressure-receiving surface provided vertically opposite to the electric wire insertion hole so as to receive an insulation displacement load, and a locking portion disposed on a side of the first end and protruding outward for engaging with a partner connector, said insulation displacement stand comprising:

a first surface for receiving the pressure-receiving surface of the connector housing;

a second surface escaping from the locking portion of the connector housing and formed at a level different from one of said first surface in a heightwise direction;

a third surface for receiving a connection surface of the connector housing, the connection surface having a hole communicating with the connection portion of the contact;

a fourth surface for receiving the one of upper and lower surfaces which the electric wire insertion hole of the connector housing is opened; and a braking unit pressing the connector housing against said third surface by pressing a surface of the connector housing from which the electric wire is drawn out, wherein said first, second, third and fourth surfaces are formed up to at least one side end surface on a side where the insulation displacement connector is charged.

2. The insulation displacement stand according to claim 1, further comprising:

a fixed rack on which said first and second surfaces are provided; and a movable rack movably provided so as to be apart from and close to said fixed rack in the heightwise direction, on which said third and fourth surfaces are provided, wherein said braking unit is provided on said fixed rack.

3. The insulation displacement stand according to claim 2, further comprising a shaft extending in a right-left direction with respect to said third surface, wherein said fixed rack and said movable rack are provided so as to be rotatable around said shaft.

4. The insulation displacement stand according to claim 1, wherein said first, second, third and fourth surfaces are provided on one rack and formed up to both side end surfaces.

5. An automatic insulation displacement machine for connecting a core of an electric wire to an insulation displacement connector with insulation displacement, the insulation displacement connector including: a connector housing having a cavity piercing the connector housing in a front-rear direction; and a contact having a connection portion at a first end and a slot for connecting the core of the electric wire on one of upper and lower surfaces thereof on a side of a second end, the contact being inserted in the cavity of the connector housing, wherein the connector housing includes an electric wire insertion hole opened on one of upper and lower surfaces of the connector housing so as to communicate with the slot of the contact, a pressure-receiving surface provided vertically opposite to the electric wire insertion hole so as to receive an insulation displacement load, and a locking portion disposed on a side of the first end and protruding outward for engaging with a partner connector, said automatic insulation displacement machine comprising:

an electric wire supplying unit consecutively reserving the electric wire;

a stationary chuck disposed in front of said electric wire supplying unit for clamping and releasing the electric wire;

a movable chuck disposed in front of said stationary chuck for clamping and releasing the electric wire, said movable chuck movable in the front-rear direction;

a pressing chuck disposed between said stationary chuck and said movable chuck for clamping and releasing the electric wire;

a first insulation displacement stand provided on one of upper and lower sides of the electric wire between said stationary chuck and said pressing chuck, said first insulation displacement stand including:

a first surface for receiving the pressure-receiving surface of the connector housing;

a second surface escaping from the locking portion of the connector housing and formed at a level different from one of said first surface in a heightwise direction;

a third surface for receiving a connection surface of the connector housing, the connection surface having a hole communicating with the connection portion of the contact;

a fourth surface for receiving the one of upper and lower surfaces which the electric wire insertion hole of the connector housing is opened; and a braking unit pressing the connector housing against said third surface by pressing a surface of the connector housing from which the electric wire is drawn out, wherein said first, second, third and fourth surfaces of said first insulation displacement stand are formed up to at least one side end surface on a side where the insulation displacement connector is charged;

a first wire guide disposed on a side opposite to said first insulation displacement stand with respect to the electric wire and moving up and down relative to said first insulation displacement stand so as to lead an end portion of the electric wire onto the slot of the contact of the insulation displacement connector;

a first punch disposed on a side opposite to said first insulation displacement stand with respect to the electric wire and moving up and down relative to said first insulation displacement stand so as to push the end portion of the electric wire onto the slot of the contact of the insulation displacement connector;

a cutting mechanism for cutting the electric wire;

a connector charging unit for charging the insulation displacement connector in said first insulation displacement stand; and a control unit for controlling said movable chuck to move forward and stop while said movable chuck clamps the end portion of the electric wire drawn out from said electric wire supplying unit through said stationary chuck, controlling said stationary chuck and said pressing chuck to strain and clamp the electric wire, controlling said cutting mechanism to cut the electric wire, controlling said first wire guide to advance so as to lead the cut end portion of the electric wire onto the slot of the insulation displacement connector retained in said first insulation displacement stand, controlling said first punch to advance so as to push the cut end portion of the electric wire into the slot, controlling said first wire guide and said first punch to retreat.

6. The automatic insulation displacement machine according to claim 5, further comprising a movable rack driving mechanism, wherein:

said first insulation displacement stand further including:

a fixed rack on which said first and second surfaces of said first insulation displacement stand are provided; and a movable rack movably provided so as to be apart from and close to said fixed rack in the heightwise direction, on which said third and fourth surfaces of said first insulation displacement stand are provided, wherein said braking unit is provided on said fixed rack of said first insulation displacement stand; and said movable rack driving mechanism retains said movable rack in a position to bring said movable rack into contact with the insulation displacement connector and rotates said movable rack in a direction to make said movable rack apart from said fixed rack at a time of completion of insulation displacement; and said control unit is for controlling said movable rack driving mechanism to make said movable rack apart from said fixed rack in said first insulation displacement stand.

7. The automatic insulation displacement machine according to claim 6, wherein said first insulation displacement stand further including a first shaft extending in a right-left direction with respect to said third surface of said first insulation displacement stand, and said fixed rack and said movable rack are provided so as to be rotatable around said first shaft.

8. The automatic insulation displacement machine according to claim 5, wherein said first, second, third and fourth surfaces of said first insulation displacement stand are provided on one rack and formed up to both side end surfaces.

9. The automatic insulation displacement machine according to claim 5, wherein said first surface of said first insulation displacement stand faces the electric wire.

10. The automatic insulation displacement machine according to claim 5, further comprising:

a second insulation displacement stand provided on one of upper and lower sides of the electric wire between said stationary chuck and said pressing chuck, said second insulation displacement stand including:

a first surface for receiving the pressure-receiving surface of the connector housing;

a second surface escaping from the locking portion of the connector housing and formed at a level different from one of said first surface in a heightwise direction;

a third surface for receiving a connection surface of the connector housing, the connection surface having a hole communicating with the connection portion of the contact;

a fourth surface for receiving the one of upper and lower surfaces which the electric wire insertion hole of the connector housing is opened; and a braking unit pressing the connector housing against said third surface by pressing a surface of the connector housing from which the electric wire is drawn out, wherein said first, second, third and fourth surfaces are formed up to at least one side end surface on a side where the insulation displacement connector is charged;

a second wire guide disposed on a side opposite to said second insulation displacement stand with respect to the electric wire and moving up and down relative to said second insulation displacement stand so as to lead an end portion of the electric wire onto the slot of the contact of the insulation displacement connector;

a second punch disposed on a side opposite to said second insulation displacement stand with respect to the electric wire and moving up and down relative to said second insulation displacement stand so as to push the end portion of the electric wire onto the slot of the contact of the insulation displacement connector, wherein said connector charging unit charges the insulation displacement connector in said second insulation displacement stand.

11. The automatic insulation displacement machine according to claim 10, further comprising a movable rack driving mechanism, wherein:

said second insulation displacement stand further including:

a fixed rack on which said first and second surfaces of said second insulation displacement stand are provided; and a movable rack movably provided so as to be apart from and close to said fixed rack in the heightwise direction, on which said third and fourth surfaces of said second insulation displacement stand are provided, wherein said braking unit is provided on said fixed rack of said second insulation displacement stand; and said movable rack driving mechanism retains said movable rack in a position to bring said movable rack into contact with the insulation displacement connector and rotates said movable rack in a direction to make said movable rack apart from said fixed rack at a time of completion of insulation displacement; and said control unit is for controlling said movable rack driving mechanism to make said movable rack apart from said fixed rack in said second insulation displacement stand.

12. The automatic insulation displacement machine according to claim 11, wherein said second insulation displacement stand further including a second shaft extending in a right-left direction with respect to said third surface of said second insulation displacement stand, wherein said fixed rack and said movable rack are provided so as to be rotatable around said second shaft.

13. The automatic insulation displacement machine according to claim 10, wherein said first, second, third and fourth surfaces of said second insulation displacement stand are provided on one rack and formed up to both side end surfaces.

14. The automatic insulation displacement machine according to claim 10, wherein said first surface of said second insulation displacement stand faces the electric wire.

* * * * *